United States Patent
Hasegawa et al.

(10) Patent No.: US 7,122,995 B2
(45) Date of Patent: Oct. 17, 2006

(54) MULTI-PHASE DC-DC CONVERTER AND CONTROL CIRCUIT FOR MULTI-PHASE DC-DC CONVERTER

(75) Inventors: Morihito Hasegawa, Kasugai (JP); Hidekiyo Ozawa, Kasugai (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/121,084

(22) Filed: May 4, 2005

(65) Prior Publication Data
US 2006/0164050 A1 Jul. 27, 2006

(30) Foreign Application Priority Data
Jan. 27, 2005 (JP) ............... 2005-020141

(51) Int. Cl.
*G05F 1/618* (2006.01)
(52) U.S. Cl. .................. 323/272; 323/284; 323/285
(58) Field of Classification Search ........ 323/222–225, 323/268, 272, 282, 284, 285
See application file for complete search history.

(56) References Cited
U.S. PATENT DOCUMENTS 6,144,194 A * 11/2000 Varga .................... 323/285
6,891,736 B1 * 5/2005 Takemura et al. ............ 363/65
7,042,203 B1 * 5/2006 Van Der Horn et al. ..... 323/285

FOREIGN PATENT DOCUMENTS

| JP | 2000-308337 | 11/2000 |
|----|-------------|---------|
| JP | 2002-44941 | 2/2002 |
| JP | 2003-284333 | 10/2003 |

* cited by examiner

Primary Examiner—Gary L Laxton
(74) Attorney, Agent, or Firm—Arent Fox PLLC

(57) ABSTRACT

A self-excited multi-phase DC—DC converter having satisfactory responsiveness when its load suddenly changes. A control unit of the converter compares output currents of first and second converter units. Based on the comparison result, the control unit generates control signals to operate a converter unit through which a smaller output current flows. For example, when an output voltage of the converter decreases due to a sudden change in the load while the first converter unit is operating to supply current, the second converter unit through which a smaller output current flows is operated to increase the output voltage.

20 Claims, 10 Drawing Sheets

MULTI-PHASE DC-DC CONVERTER AND CONTROL CIRCUIT FOR MULTI-PHASE DC-DC CONVERTER

CROSS-REFERENCE TO RELATED APPLICATIONS

This application is based upon and claims the benefit of priority from the prior Japanese Patent Application No. 2005-020141, filed on Jan. 27, 2005, the entire contents of which are incorporated herein by reference.

BACKGROUND OF THE INVENTION

The present invention relates to a converter, and more particularly, to a multi-phase DC—DC converter and a control circuit for a multi-phase DC—DC converter.

Japanese Laid-Open Patent Publication Nos. 2000-308337, 2002-044941, and 2003-284333 each describe an example of a conventional multi-phase DC—DC converter, in which a plurality of DC—DC converters are connected in parallel and each converter is operated at a different switch timing (phase).

Methods for controlling a DC—DC converter include separate-excitation and self-excitation. With separate-excitation, a DC—DC converter performs a switching operation in synchronization with a clock signal (separately-excited DC—DC converter). With self-excitation, a DC—DC converter operates based on a time constant of the system of the converter (self-excited DC—DC converter). First, a self-excited DC—DC converter and a separately-excited DC—DC converter will be described, and then a multi-phase DC—DC converter will be described.

FIG. 1 is a schematic circuit diagram of a separately-excited DC—DC converter 100. The DC—DC converter 100 includes a control unit 1a and a converter unit 90. The converter unit 90 includes an output transistor T1, a synchronous rectifier transistor T2, a choke coil L1, a current detection resistor Rs1, and a smoothing capacitor C1. The output transistor T1 is configured by an N-channel MOS (metal oxide semiconductor) transistor. The synchronous rectifier transistor T2 is configured by an N-channel MOS transistor.

The control unit 1a generates output signals DH1 and DL1, which are complementary to each other, and provides the gate of the output transistor T1 with the output signal DH1 and the gate of the synchronous rectifier transistor T2 with the output signal DL1.

The drain of the output transistor T1 is supplied with an input voltage Vi. When the output signal DH1 rises to a high (H) level, the output transistor T1 is turned on. This outputs an output voltage Vo via the choke coil L1 and the current detection resistor Rs1. When the output signal DL1 rises to an H level, the synchronous rectifier transistor T2 is turned on. This outputs the energy accumulated in the choke coil L1 as the output voltage Vo. The output voltage Vo is smoothed by the smoothing capacitor C1.

The control unit 1a is supplied with the input voltage Vi as a power supply Vcc. The voltage of the two terminals of the current detection resistor Rs1 is applied to a voltage amplifier 2 included in the control unit 1a. The voltage amplifier 2 amplifies a voltage generated between the two terminals of the current detection resistor Rs1 in accordance with an output current flowing through the current detection resistor Rs1 and provides a comparator 3 with an amplification signal.

An error amplifier 4 included in the control unit 1a amplifies the voltage difference between a divided voltage, which is obtained by resistors R1 and R2 dividing the output voltage Vo with the voltage of a reference power supply e1, and provides the comparator 3 with an amplification signal. The voltage of the reference power supply e1 is set to coincide with the divided voltage obtained by the resistors R1 and R2 when the output voltage Vo reaches a specified value.

The comparator 3 compares the voltage of the amplification signal from the voltage amplifier 2 with the voltage of the amplification signal from the error amplifier 4. When the voltage of the amplification signal from the voltage amplifier 2 is higher than the voltage of the amplification signal from the error amplifier 4, the comparator 3 provides a reset terminal R of a flip-flop circuit 6 with an output signal having an H level. When the voltage of the amplification signal from the voltage amplifier 2 is lower than the voltage of the amplification signal from the error amplifier 4, the comparator 3 provides the reset terminal R with an output signal having a low (L) level.

An oscillator 5 provides a set terminal S of the flip-flop circuit 6 with a pulse signal having a fixed frequency. The flip-flop circuit 6 generates an output signal Q having an H level and an output signal /Q having an L level when its set terminal S is provided with a pulse signal having an H level. The flip-flop circuit 6 generates an L level output signal Q and an H level output signal /Q when its reset terminal R is provided with an H level pulse signal. The output signal Q of the flip-flop circuit 6 is the output signal DH1 of the control unit 1a, and the output signal /Q of the flip-flop circuit 6 is the output signal DL1 of the control unit 1a.

The control unit 1a turns on the output transistor T1 in fixed cycles in response to the rise of a pulse signal provided from the oscillator 5. When the output transistor T1 is turned on, the current flowing through the choke coil L1 and the current detection resistor Rs increases, and the voltage of the amplification signal of the voltage amplifier 2 increases. When the voltage of the amplification signal of the voltage amplifier 2 increases above the voltage of the amplification signal of the error amplifier 4, the reset terminal R of the flip-flop circuit 6 is provided with an H level signal. As a result, the output transistor T1 is turned off, the synchronous rectifier transistor T2 is turned on, and energy accumulated in the choke coil L1 is output.

If the output voltage Vo decreases when the output transistors T1 and T2 are turned on or off, the voltage of the amplification signal of the error amplifier 4 becomes higher than the voltage of the amplification signal of the voltage amplifier 2. In this case, a relatively long time is required for the output signal of the comparator 3 to rise to an H level. This extends the on-time of the output transistor T1.

When the output voltage Vo increases, the voltage of the amplification signal of the error amplifier 4 becomes lower than the voltage of the amplification signal of the voltage amplifier 2. In this case, the time required for the output signal of the comparator 3 to rise to an H level is short. This shortens the on-time of the output transistor T1.

The output transistor T1 is turned on in fixed cycles in accordance with the frequency of a pulse signal provided from the oscillator 5. The timing at which the output transistor T1 is turned off is determined in accordance with an increase in the output current. The off timing of the transistor T1 is changed in accordance with an increase or a decrease in the output voltage Vo to keep the output voltage Vo constant.

FIG. 2 is a schematic circuit diagram of a self-excited DC—DC converter 200. The DC—DC converter 200 includes a converter unit 90, which is the same as the converter unit 90 included in the DC—DC converter 100 shown in FIG. 1.

A comparator 7 included in a control unit 1b compares a divided voltage, which is obtained by resistors R1 and R2 dividing an output voltage Vo with the voltage of a reference power supply e1. The voltage of the reference power supply e1 is set to coincide with the divided voltage obtained by the resistors R1 and R2 when the output voltage Vo reaches a specified value. When the divided voltage obtained by the resistors R1 and R2 is higher than the voltage of the reference power supply e1, the comparator 7 generates an L level output signal. When the divided voltage obtained by the resistors R1 and R2 is lower than the voltage of the reference power supply e1, the comparator 7 generates an H level output signal.

A one-shot flop—flop circuit 8 receives an output signal from the comparator 7 and generates signals Q and /Q, which are complementary to each other. The one-shot flip-flop circuit 8 generates an H level output signal Q for a fixed time in response to an H level output signal from the comparator 7.

The output signal Q of the one-shot flip-flop circuit 8 is provided to the gate of an output transistor T1 as an output signal DH1, and the output signal /Q of the flip-flop circuit 8 is provided to the gate of a synchronous rectifier transistor T2 as an output signal DL1.

In the DC—DC converter 200, which fixes the on-time of the transistor T1, the output voltage Vo increases when the output transistor T1 is turned on, and energy accumulated in the choke coil L1 is discharged when the output transistor T1 is turned off. When the energy accumulated in the choke coil L1 decreases, the output voltage Vo decreases and the divided voltage obtained by the resistors R1 and R2 decreases below the voltage of the reference power supply e1. In this case, the one-shot flip-flop circuit 8 generates an H level output signal Q for a fixed time so that the transistor T1 is turned on and maintained to be on for the fixed time. With this operation, the output voltage Vo is maintained to be a constant voltage based on the reference power supply e1. The on-time of the output transistor T1 is fixed irrespective of a period in which the output voltage Vo is changing. However, when the output voltage Vo decreases, the off-time of the output transistor T1 is shortened. As a result, the switching frequency of the output transistor T1 changes in accordance with the output voltage Vo.

FIG. 3 is a schematic circuit diagram of a multi-phase DC—DC converter 300 having two phases. Converter units 9a and 9b are the same as the converter unit 90 shown in FIG. 1. A smoothing capacitor C1 is shared by the two converter units 9a and 9b.

A control unit 1c includes a voltage amplifier 2a, a voltage amplifier 2b, a comparator 3a, a comparator 3b, a flip-flop circuit 6a, and a flip-flop circuit 6b. The voltage amplifier 2a amplifies a voltage between the two terminals of a current detection resistor Rs1. The voltage amplifier 2b amplifies a voltage between the two terminals of a current detection resistor Rs2. The comparator 3a compares an output voltage of the voltage amplifier 2a with an output voltage of an error amplifier 4. The comparator 3b compares an output voltage of the voltage amplifier 2b with an output voltage of the error amplifier 4. The flip-flop circuit 6a generates output signals DH1 and DL1 for controlling the converter unit 9a in accordance with an output signal of the comparator 3a. The flip-flop circuit 6b generates output signals DH2 and DL2 for controlling the converter unit 9b in accordance with an output signal of the comparator 3b.

An oscillator 5a provides a set terminal S of each of the flip-flop circuits 6a and 6b with a pulse signal. The oscillator 5a alternately provides the flip-flop circuits 6a and 6b with two pulse signals. Thus, the frequency of the pulse signal of the oscillator 5a is substantially twice the frequency of the pulse signal of the oscillator 5 shown in FIG. 8.

Each of the converter units 9a and 9b is operated by the control unit 1c at the same frequency as in the current-mode type DC—DC converter 100 shown in FIG. 1. However, the flip-flop circuits 6a and 6b operate in accordance with two pulse signals having phases deviating from each other by 180 degrees. Thus, the converter units 9a and 9b operate at a frequency substantially twice the operating frequency of their load.

SUMMARY OF THE INVENTION

The separately-excited DC—DC converter 100 shown in FIG. 1 always operates at the same frequency, and has a characteristic that the ripple of its output voltage Vo is small. However, the DC—DC converter 100 has a time lag between when its load suddenly changes to when the output transistor T1 is turned on. Thus, the DC—DC converter 100 has a problem of poor responsiveness to a sudden change in the load. To solve this problem, the operating frequency of the DC—DC converter shown in FIG. 1 may be increased, or the number of phases of the multi-phase DC—DC converter 300 shown in FIG. 3 may be increased. However, if the switching cycle of the output transistor is further shortened, the operating efficiency of the output transistor decreases due to a gate capacity of the output transistor. Thus, increasing the switching frequency of the output transistor fails to sufficiently improve the load responsiveness of the converter.

In the self-excited DC—DC converter 200 shown in FIG. 2, the output transistor T1 is turned on in accordance with the output voltage. Thus, the DC—DC converter 200 has better responsiveness to a sudden change of its load. However, the timing at which the output transistor is turned on is not fixed. Thus, the DC—DC converter 200 fails to execute multi-phase control of changing the switching timing (phase) of each of a plurality of DC—DC converters connected in parallel.

The present invention provides a self-excited multi-phase DC—DC converter having satisfactory responsiveness to a sudden change in its load and a control circuit for such a multi-phase DC—DC converter.

One aspect of the present invention is a multi-phase DC—DC converter including an output terminal, a plurality of converter units, each receiving an input voltage and generating an output voltage for said output terminal, and a control unit connected to the plurality of converter units. The control unit includes a first voltage comparator for comparing the output voltage with a first reference voltage to generate a first voltage comparison signal indicating the comparison result. A current comparison circuit compares a plurality of output currents that are in accordance with the output voltages of the converter units to generate a plurality of current comparison signals respectively corresponding to the converter units. A signal generation circuit, connected to the first voltage comparator and the current comparison circuit, generates a plurality of control signals for respectively controlling the converter units so that a converter unit through which a smaller output current flows is operated in accordance with the current comparison signals generated by the current comparison circuit when the first voltage comparison signal indicates that the output voltage is lower than the first reference voltage.

Another aspect of the present invention is a control circuit for controlling a multi-phase DC—DC converter that includes an output terminal and a plurality of converter units, each receiving an input voltage and generating an output voltage for the output terminal of the DC—DC converter. The circuit includes a first voltage comparator for comparing the output voltage with a first reference voltage to generate a first voltage comparison signal indicating the comparison result. A current comparison circuit compares a plurality of output currents that are in accordance with the output voltages generated by the converter units to generate a plurality of current comparison signals respectively corresponding to the converter units. A signal generation circuit, connected to the first voltage comparator and the current comparison circuit, generates a plurality of control signals for respectively controlling the converter units so that a converter unit through which a smaller output current flows is operated in accordance with the current comparison signals generated by the current comparison circuit when the first voltage comparison signal indicates that the output voltage is lower than the first reference voltage.

A further aspect of the present invention is a method for controlling a multi-phase DC—DC converter including an output terminal and a plurality of converter units, each receiving an input voltage and generating an output voltage for the output terminal of the DC—DC converter. The method includes comparing the output voltage with a first reference voltage to generate a first voltage comparison signal indicating the comparison result, comparing a plurality of output currents that are in accordance with the output voltages generated by the converter units to generate a plurality of current comparison signals respectively corresponding to the converter units, and generating a plurality of control signals for respectively controlling the converter units so that a converter unit through which a smaller output current flows is operated in accordance with the current comparison signals when the first voltage comparison signal indicates that the output voltage is lower than the first reference voltage.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
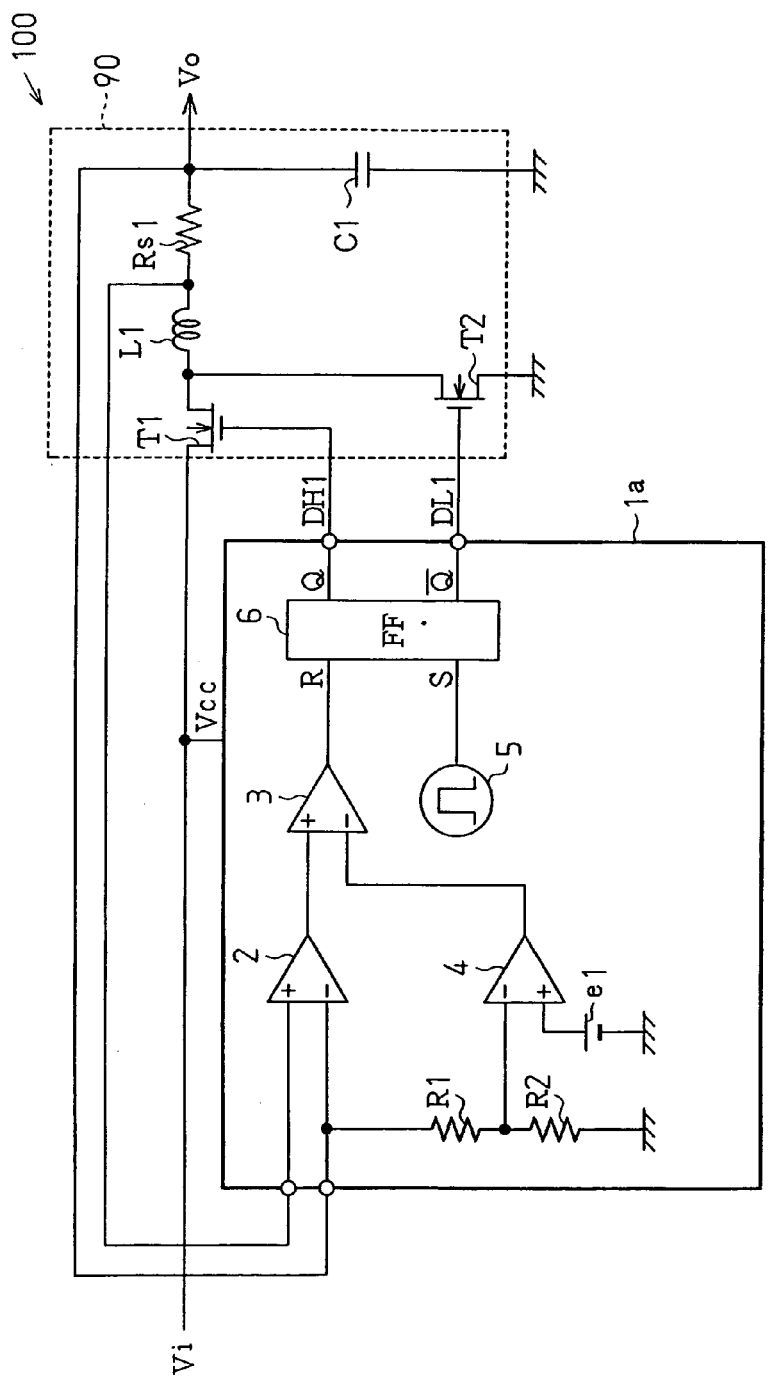
FIG. 1 is a schematic circuit diagram of a conventional separately-excited DC—DC converter.
Figure 2:
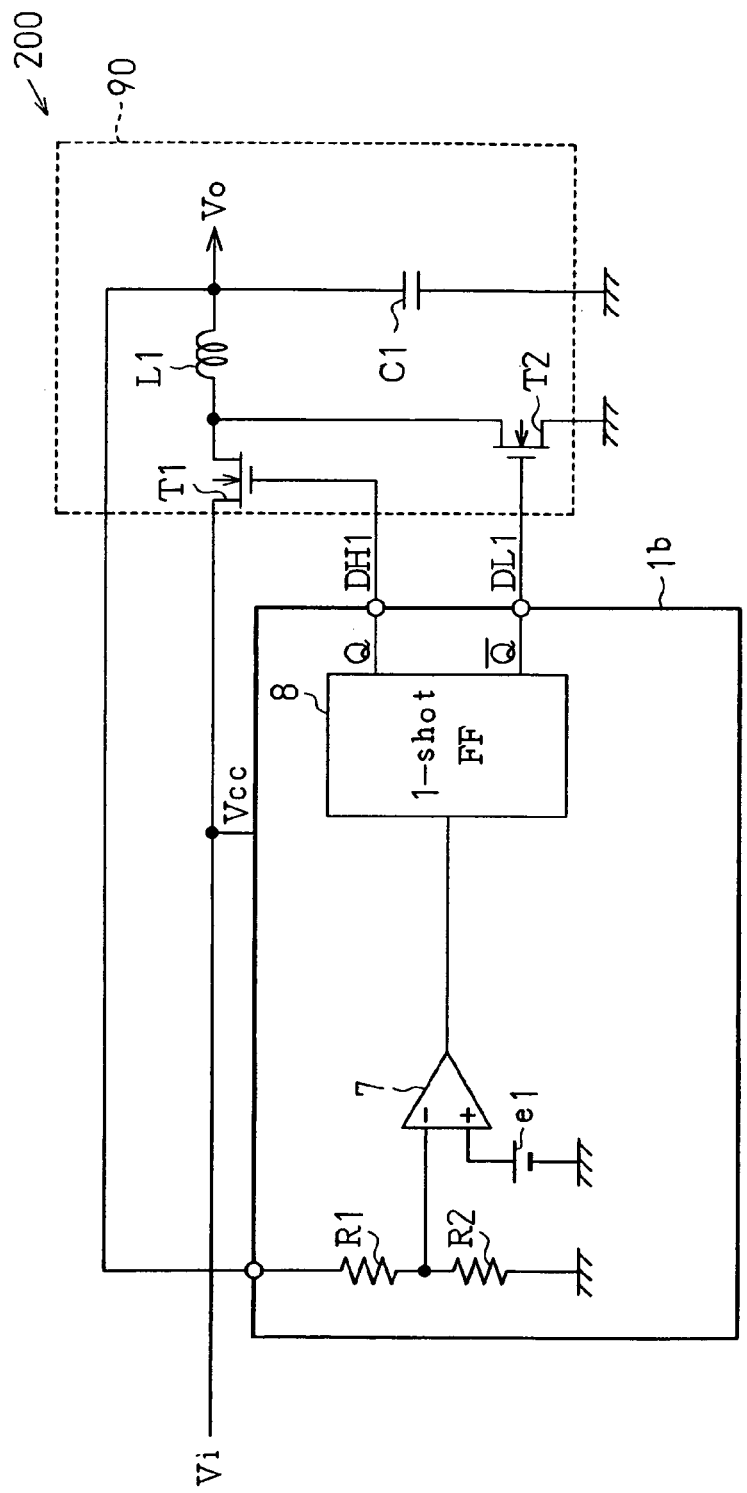
FIG. 2 is a schematic circuit diagram of a conventional self-excited DC—DC converter.
Figure 3:
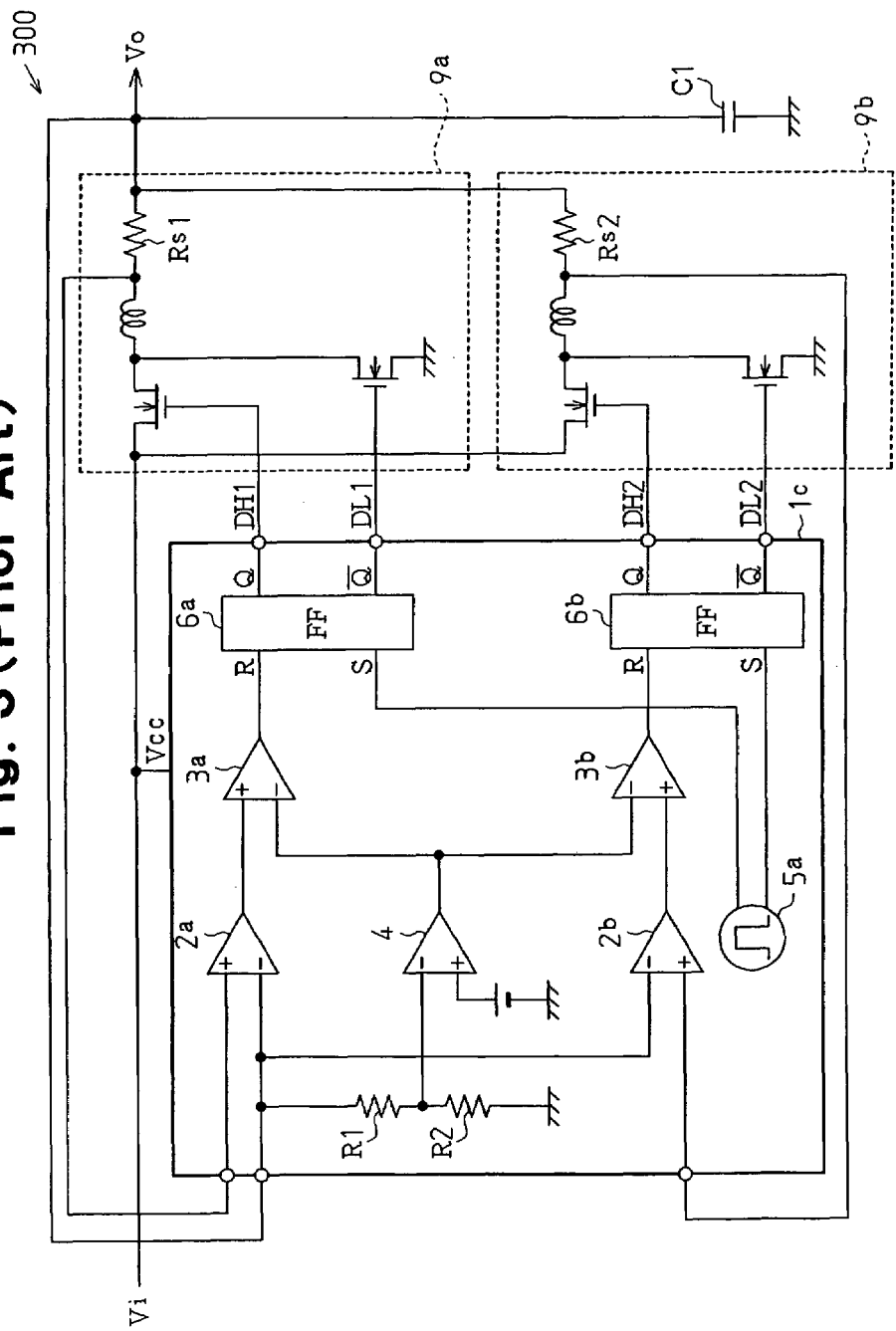
FIG. 3 is a schematic circuit diagram of a conventional multi-phase DC—DC converter.

In the drawings, like numerals are used for like elements throughout.

Figure 4:
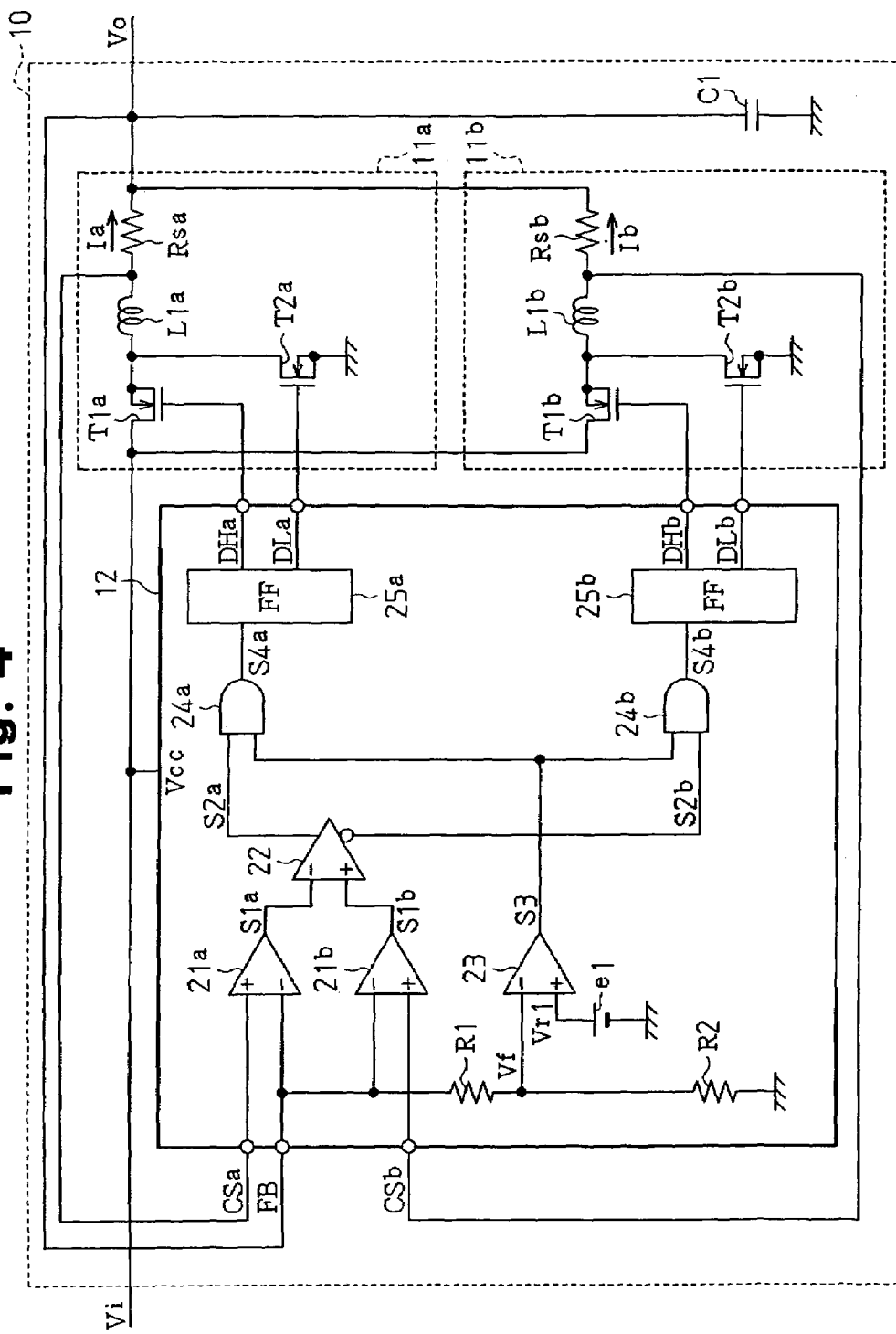
FIG. 4 is a schematic circuit diagram of a DC—DC converter according to a first embodiment of the present invention.

FIG. 4 is a schematic circuit diagram of a multi-phase DC—DC converter 10 according to a first embodiment of the present invention.

The DC—DC converter 10 is a self-excited multi-phase DC—DC converter having two phases. The DC—DC converter 10 includes two converter units 11a and 11b, one control unit 12, and a smoothing capacitor C1.

The first converter unit 11a includes an output transistor T1a, a synchronous rectifier transistor T2a, a choke coil L1a, and a current detection resistor Rsa. The output transistor T1a is configured by an N-channel MOS transistor. The synchronous rectifier transistor T2a is configured by an N-channel MOS transistor. The output transistor T1a has a gate for receiving a control signal DHa from the control unit 12, a drain for receiving an input voltage Vi, and a source connected to the synchronous rectifier transistor T2a. The synchronous rectifier transistor T2a has a gate for receiving a control signal DLa from the control unit 12, a drain connected to the output transistor T1a, and a source connected to ground GND. The choke coil L1a has a first terminal connected to the output transistor T1a and a second terminal connected to the current detection resistor Rsa. The current detection resistor Rsa has a first terminal connected to the choke coil L1a and a second terminal connected to the smoothing capacitor C1. The capacitor C1 has a first terminal connected to the current detection resistor Rsa and a second terminal connected to a ground GND.

The control unit 12 generates the first control signal DHa and the second control signal DLa, which are complementary to each other. The output transistor T1a and the synchronous rectifier transistor T2a are complementarily turned on and off in response to the first control signal DHa and the second control signal DLa. With the transistors T1a and T2a turned on and off, the input voltage Vi is lowered, and an output voltage Voa is generated. The output voltage Voa is smoothed by the smoothing capacitor C1. The two terminals of the current detection resistor Rsa are connected to the control unit 12. A signal CSa having a voltage at the first terminal of the resistor Rsa (node between the choke coil L1a and the resistor Rsa) and a signal FB having a voltage at the second terminal of the resistor Rsa are fed back to the control unit 12.

The second converter unit 11b includes an output transistor T1b, a synchronous rectifier transistor T2b, a choke coil L1b, and a current detection resistor Rsb. The output transistor T1b is configured by an N-channel MOS transistor. The synchronous rectifier transistor T2b is configured by an N-channel MOS transistor. The output transistor T1b has a gate for receiving a control signal DHb from the control unit 12, a drain for receiving the input voltage Vi, and a source connected to the synchronous rectifier transistor T2b. The synchronous rectifier transistor T2b has a gate for receiving a control signal DLb from the control unit 12, a drain connected to the output transistor T1b, and a source connected to a ground GND. The choke coil L1b has a first terminal connected to the output transistor T1b and a second terminal connected to the current detection resistor Rsb. The current detection resistor Rsb has a first terminal connected to the choke coil L1b and a second terminal connected to the smoothing capacitor C1. The capacitor C1 has a first terminal connected to the current detection resistor Rsb and a second terminal connected to the ground GND.

The control unit 12 generates the first control signal DHb and the second control signal DLb, which are complementary to each other. The output transistor T1b and the synchronous rectifier transistor T2b are complementarily turned on and off in response to the first control signal DHb and the second control signal DLb. When the transistors T1b and T2b are respectively turned on and off, the input voltage Vi is lowered, and an output voltage Vob is generated. The output voltage Vob is smoothed by the smoothing capacitor C1. The two terminals of the current detection resistor Rsb are connected to the control unit 12. A signal CSb having a voltage at the first terminal of the resistor Rsb (node between the choke coil L1b and the resistor Rsb) and a signal FB having a voltage at the second terminal of the resistor Rsb are fed back to the control unit 12.

The control unit 12 detects an output current Ia based on the voltage between the two terminals of the current detection resistor Rsa (i.e., the voltage of the signals CSa and FB fed back). Further, the control unit 12 detects an output current Ib based on the voltage between the two terminals of the current detection resistor Rsb (i.e., the voltage of the signals CSb and FB fed back). Based on the detected currents Ia and Ib, the control unit 12 generates the control signals DHa and DLa, which are provided to the first converter unit 11a, and the control signals DHb and DLb, which are provided to the second converter unit 11b.

The control unit 12 includes two voltage amplifiers 21a and 21b, a comparator 22, a voltage comparator 23, a reference power supply e1, resistors R1 and R2, two AND circuits 24a and 24b, and two one-shot flip-flop circuits (hereafter referred to as "FF circuits") 25a and 25b. The voltage amplifiers 21a and 21b and the comparator 22 configure a voltage comparison circuit. The AND circuits 24a and 24b and the FF circuits 25a and 25b configure a signal generation circuit.

The first voltage amplifier 21a has a non-inversion input terminal for receiving the signal CSa, which is fed back from the first converter unit 11a, and an inversion input terminal for receiving the signal FB. The first voltage amplifier 21a amplifies the voltage difference between the signals CSa and FB to generate an amplification signal S1a. The amplification signal S1a has a voltage corresponding to a voltage difference between the two terminals of the current detection resistor Rsa, that is, the current Ia flowing through the current detection resistor Rsa.

The second voltage amplifier 21b has a non-inversion input terminal for receiving the signal CSb, which is fed back from the second converter unit 11b, and an inversion input terminal for receiving the signal FB. The second voltage amplifier 21b amplifies a voltage difference between the signals CSb and FB, to generate an amplification signal S1b. The amplification signal S1b has a voltage corresponding to a voltage difference between the two terminals of the current detection resistor Rsb, that is, the current Ib flowing through the current detection resistor Rsb.

The comparator 22 has an inversion input terminal for receiving the amplification signal S1a of the first voltage amplifier 21a and a non-inversion input terminal for receiving the amplification signal S1b of the second voltage amplifier 21b. The comparator 22 compares the voltages of the amplification signals S1a and S1b. Based on the comparison result, the comparator 22 generates comparison signals S2a and S2b, which are complementary to each other. When the voltage of the amplification signal S1a of the first voltage amplifier 21a is higher than the voltage of the amplification signal S1b of the second voltage amplifier 21b, the comparator 22 generates an L level comparison signal S2a and an H level comparison signal S2b. When the voltage of the amplification signal S1a is lower than the voltage of the amplification signal S1b, the comparator 22 generates an H level comparison signal S2a and an L level comparison signal S2b.

The voltage of the amplification signal S1a of the first voltage amplifier 21a corresponds to the voltage between the two terminals of the current detection resistor Rsa, that is, the current Ia flowing through the current detection resistor Rsa. The voltage of the amplification signal S1b of the second voltage amplifier 21b corresponds to the current Ib flowing through the current detection resistor Rsb. Thus, the comparator 22 compares the output current Ia of the first converter unit 11a with the output current Ib of the second converter unit 11b. The control unit 12 generates the control signals DHa, DLa, DHb, and DLb according to the comparison result.

The signal FB is fed back to the first terminal of the first resistor R1. The second terminal of the first resistor R1 is connected to the first terminal of the second resistor R2, and the second terminal of the second resistor R2 is connected to the ground GND. A node between the first resistor R1 and the second resistor R2 is connected to the voltage comparator 23. The first and second resistors P1 and R2 configure a voltage dividing circuit, which divides the feed back signal FB in accordance with the resistance ratio of the first and second resistors R1 and R2 to generate a divided voltage Vf.

The voltage comparator 23 has an inversion input terminal for receiving the divided voltage Vf of the signal FB and a non-inversion input terminal for receiving a reference voltage Vr1 from the reference power supply e1. The reference voltage Vr1 is set to coincide with the divided voltage obtained by the resistors R1 and R2 when the output voltage Vo reaches a specified value. The voltage comparator 23 compares the divided voltage Vf with the reference voltage Vr and generates a comparison signal S3 having a voltage level according to the comparison result. The voltage comparator 23 generates an L level comparison signal S3 when the voltage Vf is higher than the reference voltage Vr1 and generates an H level comparison signal S3 when the voltage Vf is lower than the reference voltage Vr1.

The first AND circuit 24a receives the comparison signals S2a and S3, implements a logical AND operation with the comparison signals S2a and S3, and generates a signal S4a having a voltage level according to the operation result. The second AND circuit 24b receives the comparison signals S2b and S3, implements a logical AND operation with the comparison signals S2b and S3, and generates a signal S4b having a voltage level according to the operation result.

The comparison signal S2a, which is provided to the first AND circuit 24a, and the comparison signal S2b, which is provided to the second AND circuit 24b, are complementary to each other. Thus, the first AND circuit 24a generates an L level signal S4a when the output voltage Vo is higher than a predetermined voltage (specifically, when the divided voltage Vf of the output voltage Vo is higher than the reference voltage Vr1). The second AND circuit 24b generates an L level signal S4b when the output voltage Vo is higher than the predetermined voltage. Further, when the output voltage Vo is lower than the predetermined voltage, one of the first and second AND circuits 24a and 24b generates an H level signal, and the other one of the first and second AND circuits 24a and 24b generates an L level signal. More specifically, the AND circuit 24a or 24b corresponding to the converter unit 11a or 11b through which a lower output current flows generates an H level signal.

The first FF circuit 25a receives the output signal S4a from the first AND circuit 24a and generates an H level control signal DHa for a fixed time based on the output signal S4a. Further, the first FF circuit 25a generates a control signal DLa complementary to the control signal DHa. The second FF circuit 25a receives the output signal S4b from the second AND circuit 24b and generates an H level control signal DHb for a fixed time based on the output signal S4b. Further, the second FF circuit 25a generates a control signal DLb complementary to the control signal DHb.

The operation of the multi-phase DC—DC converter 10 will now be described.

It is assumed that the current Ib flowing through the current detection resistor Rsb of the second converter unit 11b is smaller than the current Ia flowing through the current detection resistor Rsa of the first converter unit 11a. The comparator 22 generates an L level comparison signal S2a and an H level comparison signal S2b. In this state, when the output voltage Vo decreases below the predetermined voltage (the divided voltage Vf decreases below the reference voltage Vr1), the voltage comparator 23 generates an H level comparison signal S3. Thus, the first AND circuit 24a generates an L level signal S4a and the second AND circuit 24b generates an H level signal S4b.

The second FF circuit 25b generates an H level control signal DHb for a fixed time in response to the H level signal S4b and generates a control signal DLb complementary to the control signal DHb. In response to the control signal DHb, the output transistor T1b is turned on, so that the current Ib flows and the output voltage Vo increases. After the fixed time elapses, the output transistor T1b is turned off, so that the synchronous rectifier transistor T2b is turned on and the energy accumulated in the choke coil L1b is discharged.

When the current Ib is greater than the current Ia, the comparator 22 generates an H level comparison signal S2a and an L level comparison signal S2b. In this state, when the output voltage Vo decreases below the predetermined voltage (the divided voltage Vf decreases below the reference voltage Vr1), the voltage comparator 23 generates an H level comparison signal S3. Thus, the first AND circuit 24a generates an H level signal S4a and the second AND circuit 24b generates an L level signal S4b.

The first FF circuit 25a generates an H level control signal DHa for a fixed time in response to the H level signal S4a, and generates a control signal DLa complementary to the control signal DHa. In response to the control signal DHa, the output transistor T1a is turned on, so that the current Ia flows and the output voltage Vo increases. After the fixed time elapses, the output transistor T1a is turned off, so that the synchronous rectifier transistor T2a is turned on and energy accumulated in the choke coil L1a is discharged.

The multi-phase DC—DC converter 10 of the first embodiment has the advantages described below.

(1) The control unit 12 compares the output voltage Vo with the reference voltage Vr1. Based on the comparison result, the control unit 12 turns on the output transistors T1a and T1b of the converter units 11a and 11b for a fixed time. Since the multi-phase DC—DC converter 10 is a self-excited multi-phase converter, each output transistor is turned on in response to a change in the output voltage of the multi-phase DC—DC converter 10 caused by a sudden change in its load. In this way, the multi-phase DC—DC converter 10 has satisfactory responsiveness.

(2) The control unit 12 compares the output currents Ia and Ib of the first and second converter units 11a and 11b. Based on the comparison result, the control unit 12 generates control signals so that a converter unit through which a smaller output current flows is operated. Thus, when the output voltage Vo decreases due to a sudden change in the load while one converter unit (e.g., the first converter unit 11a) is operating to supply the current Ia, another converter unit (the second converter unit 11b in the present embodiment), through which a smaller output current flows, is operated. In this way, a plurality of converter units are operated sequentially without requiring their timings to be controlled. The DC—DC converter 10 has improved responsiveness to a change in the output voltage Vo.

Figure 5:
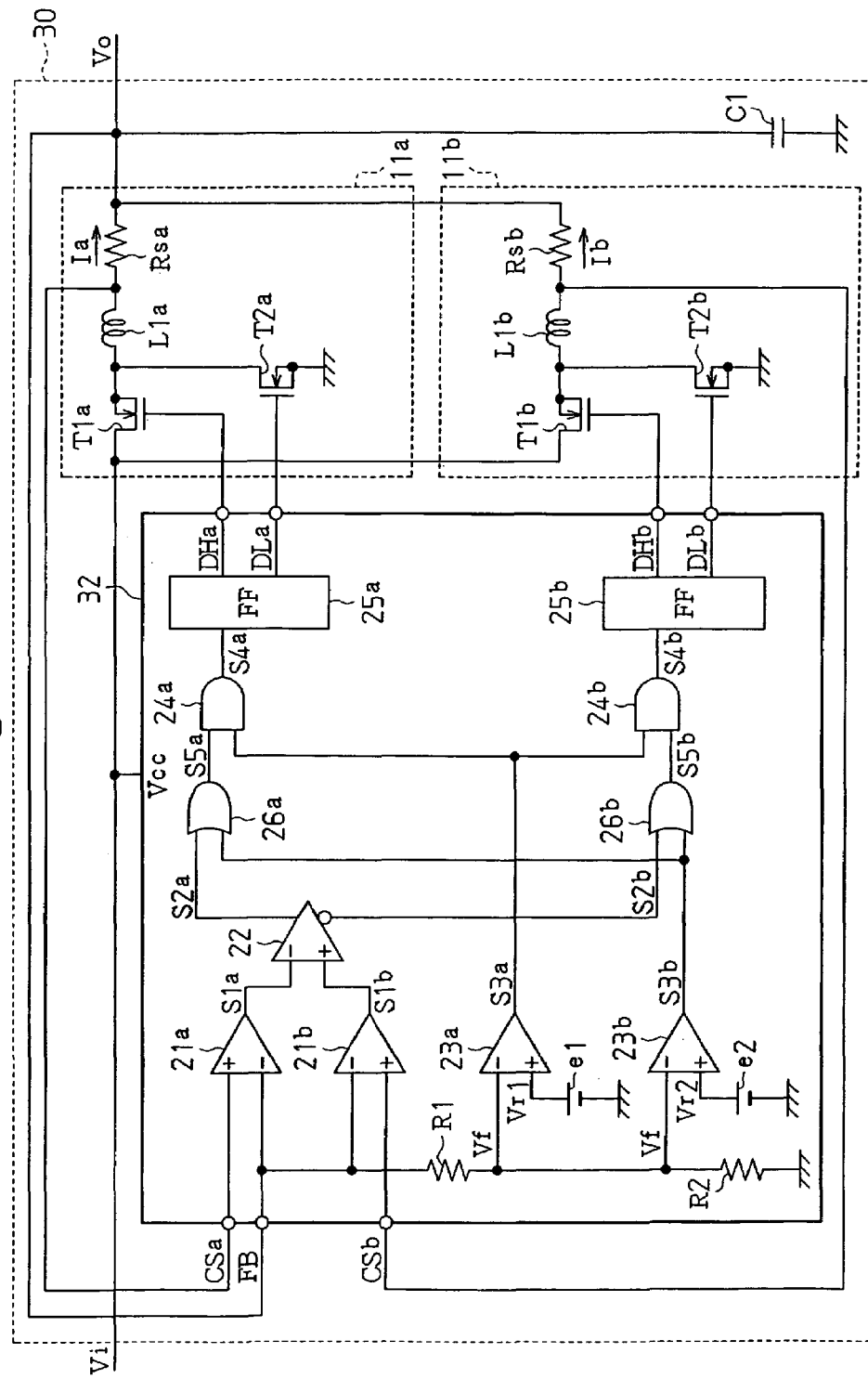
FIG. 5 is a schematic circuit diagram of a DC—DC converter according to a second embodiment of the present invention.

FIG. 5 is a schematic circuit diagram of a multi-phase DC—DC converter 30 according to a second embodiment of the present invention.

The DC—DC converter 30 is a self-excited multi-phase DC—DC converter having two phases. The DC—DC converter 30 includes two converter units 11a and 11b, one control unit 32, and a smoothing capacitor C1.

The control unit 32 includes two voltage amplifiers 21a and 21b, a comparator 22, two voltage comparators 23a and 23b, two reference power supplies e1 and e2, two resistors R1 and R2, two AND circuits 24a and 24b, two one-shot flip-flop circuits (hereafter referred to as "FF circuits") 25a and 25b, and two OR circuits 26a and 26b. The control unit 32 of the second embodiment has a configuration in which the voltage comparator 23b, the reference power supply e2, and the OR circuits 26a and 26b are added to the control unit 12 of the first embodiment.

The first voltage comparator 23a operates substantially in the same manner as the voltage comparator 23 of the first embodiment. More specifically, the first voltage comparator 23a compares a divided voltage Vf with a reference voltage Vr1, and generates a comparison signal S3a having a voltage level according to the comparison result.

The second voltage comparator 23b has an inversion input terminal for receiving the divided voltage Vf of the signal FB and a non-inversion input terminal for receiving a second reference voltage Vr2 from the reference power supply e2. The second reference voltage Vr2 is set to be lower than the first reference voltage Vr1, which is supplied to the first voltage comparator 23a. The second voltage comparator 23b compares the divided voltage Vf with the second reference voltage Vr2 and generates a comparison signal S3b having a voltage level according to the comparison result. The second voltage comparator 23b generates an L level comparison signal S3b when the voltage Vf is higher than the second reference voltage Vr2 and generates an H level comparison signal S3b when the voltage Vf is lower than the second reference voltage Vr2.

The first OR circuit 26a receives the comparison signal S2a from the comparator 22 and the comparison signal S3b from the second voltage comparator 23b, implements the logical OR operation of the comparison signals S2a and S3b and generates a signal S5a having a voltage level according to the operation result. The second OR circuit 26b receives the comparison signal S2b from the comparator 22 and the comparison signal S3b from the second voltage comparator 23b, implements the logical OR operation of the comparison signals S2b and S3b, and generates a signal S5b having a voltage level according to the operation result.

The comparison signal S2a, which is provided to the first OR circuit 26a, and the comparison signal S2b, which is provided to the second OR circuit 26b, are complementary to each other. Thus, the first OR circuit 26a generates a signal S5a having a voltage level substantially the same as the level of the output comparison signal S2a of the comparator 22 when the output voltage Vo is higher than a second predetermined voltage (specifically, the divided voltage Vf of the output voltage Vo is higher than the second reference voltage Vr2). The second OR circuit 26b generates a signal S5b having a voltage level that is substantially the same as the level of the output comparison signal S2b of the comparator 22 when the output voltage Vo is higher than the second predetermined voltage. Further, when the output voltage Vo is lower than the second predetermined voltage, the first and second OR circuits 26a and 26b generate H level signals S5a and S5b, respectively.

When the output voltage Vo is higher than the second predetermined voltage, the control unit 32 operates in the same manner as the control unit 12 of the first embodiment. When the output voltage Vo decreases below the second predetermined voltage, the first and second OR circuits 26a and 26b generate H level signals S5a and S5b, respectively. The output voltage Vo is lower than the first predetermined voltage. Thus, the first voltage comparator 23a generates an H level comparison signal S3a. Accordingly, the first and second AND circuits 24a and 24b generate H level signals S4a and S4b, respectively. Thus, the first FF circuit 25a and the second FF circuit 25b generate H level control signals DHa and DHb, respectively. In this way, the first and second converter units 11a and 11b are operated synchronously to supply the load with the currents Ia and Ib. In other words, the load is supplied with a current twice as large as the current supplied during normal operation. Thus, when the output voltage Vo decreases due to a sudden change of the load, the output voltage Vo increases in a shorter time as compared with when only one converter unit is operated.

The multi-phase DC—DC converter 30 of the second embodiment has the advantages described below.

The control unit 32 includes the second voltage comparator 23b, which compares the output voltage Vo (divided voltage Vf) with the second reference voltage Vr2 that is lower than the first reference voltage Vr1. The control unit 32 operates the first and second converter units 11a and 11b synchronously in accordance with the comparison signal S3b of the second voltage comparator 23b. This enables a greater current to be supplied to the load as compared with during normal operation in which the converter units 11a and 11b are alternately operated. As a result, even when the output voltage Vo decreases due to a sudden change in the load, the output voltage Vo increases within a short period of time.

Figure 6:
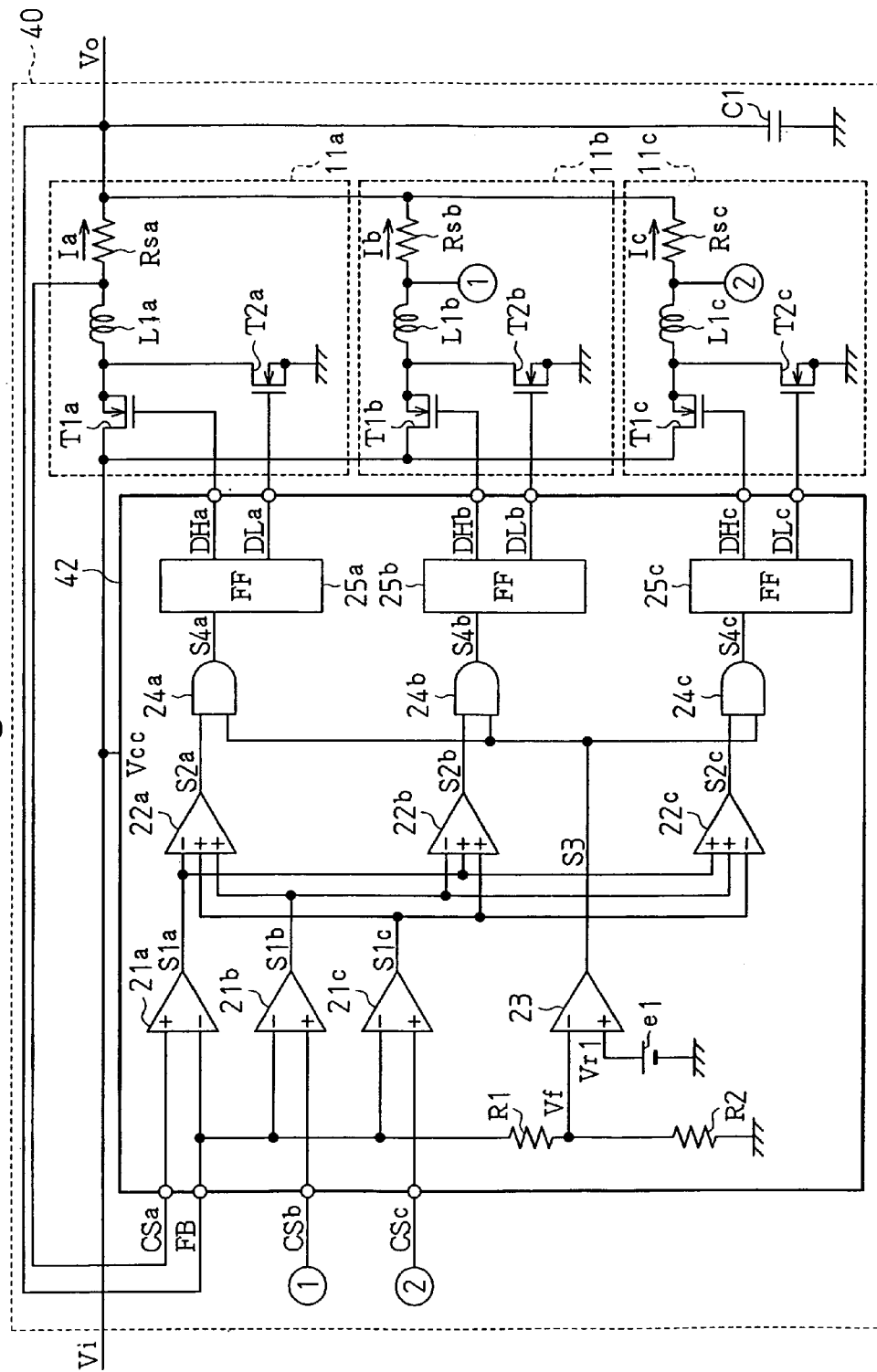
FIG. 6 is a schematic circuit diagram of a DC—DC converter according to a third embodiment of the present invention.

FIG. 6 is a schematic circuit diagram of a multi-phase DC—DC converter 40 according to a third embodiment of the present invention.

The DC—DC converter 40 is a self-excited multi-phase DC—DC converter having three phases. The DC—DC converter 40 includes three converter units 11a, 11b, and 11c, one control unit 42, and a smoothing capacitor C1.

Each of the converter units 11a to 11c has the same configuration. The first converter unit 11a includes an output transistor T1a, a synchronous rectifier transistor T2a, a choke coil L1a, and a current detection resistor Rsa. The output transistor T1a is configured by an N-channel MOS transistor. The synchronous rectifier transistor T2a is configured by an N-channel MOS transistor. The second converter unit 11b includes an output transistor T1b, a synchronous rectifier transistor T2b, a choke coil L1b, and a current detection resistor Rsb. The output transistor T1b is configured by an N-channel MOS transistor. The synchronous rectifier transistor T2b is configured by an N-channel MOS transistor. The third converter unit 11c includes an output transistor T1c, a synchronous rectifier transistor T2c, a choke coil L1c, and a current detection resistor Rsc. The output transistor T1c is configured by an N-channel MOS transistor. The synchronous rectifier transistor T2c is configured by an N-channel MOS transistor.

The control unit 42 includes three voltage amplifiers 21a, 21b, and 21c, three comparators 22a, 22b, and 22c, a voltage comparator 23, a reference power supply e1, two resistors R1 and R2, three AND circuits 24a, 24b, and 24c, and three one-shot flip-flop circuits (hereafter referred to as "FF circuits") 25a, 25b, and 25c.

The voltage amplifiers 21a, 21b, and 21c are arranged in correspondence with the converter units 11a, 11b, and 11c, respectively. The voltage amplifiers 21a, 21b, and 21c respectively generate signals S1a, S1b, and S1c in accordance with current flowing through a current detection resistor included in the corresponding converter unit.

Each of the comparators 22a, 22b, and 22c is a multiple-input comparator and has one inversion input terminal and a plurality of (two in the present embodiment) non-inversion input terminals. Each of the comparators 22a, 22b, and 22c generates an H level signal when the voltage of a signal provided to its inversion input terminal is lower than the voltage of a signal provided to each of its non-inversion input terminals. Each of the comparators 22a, 22b, and 22c generates an L level signal when the voltage of a signal provided to its inversion input terminal is higher than the voltage of a signal provided to at least one of its non-inversion input terminals.

The comparators 22a, 22b, and 22c are arranged in correspondence with the converter units 11a, 11b, and 11c, respectively. The inversion input terminal of each of the comparators 22a, 22b, and 22c is provided, from the voltage amplifier 21a, 21b, or 21c, with the amplification signal S1a, S1b, or S1c in accordance with the current Ia, Ib, or Ic flowing through the current detection resistor Rsa, Rsb, or Rsc of the corresponding converter unit 11a, 11b, or 11c. The non-inversion input terminals of each of the comparators 22a, 22b, and 22c are provided with the amplification signal S1a, S1b, or S1c in accordance with the current Ia, Ib, or Ic flowing through the other converter unit 11a, 11b, or 11c. For example, the inversion input terminal of the comparator 22a is provided, from the first voltage amplifier 21a, with the amplification signal S1a in accordance with the current Ia flowing through the current detection resistor Rsa of the corresponding converter unit 11a. The two non-inversion input terminals of the comparator 22a are provided with the amplification signals S1b and S1c of the other voltage amplifiers 21b and 21c. Each of the comparators 22a, 22b, and 22c generates an H level comparison signal S2a, S2b, or S2c when the current flowing through the corresponding converter unit is lower than the currents flowing through the other converter units.

Each of the AND circuits 24a, 24b, and 24c receives the comparison signal S3 of the voltage comparator 23 and the comparison signal S2a, S2b, or S2c of the corresponding comparator 22a, 22b, or 22c. When both of the comparison signals are at an H level, the AND circuit generates an H level signal. More specifically, the AND circuit corresponding to the converter unit 11a, 11b, or 11c, through which the current Ia, Ib, or Ic smaller than the currents flowing through the other converter units (i.e., the AND circuit corresponding to the converter unit 11a, 11b, or 11c through which the smallest current Ia, Ib, or Ic flows), generates an H level signal.

According to the output signals S4a, S4b, and S4c of the AND circuits 24a, 24b, and 24c, the FF circuits 25a, 25b, and 25c generate control signals DHa and DLa, DHb and DLb, and DHc and DLc, respectively. The converter units 11a, 11b, and 11c are operated in response to these control signals. More specifically, when the output voltage Vo decreases below a predetermined voltage (the divided voltage Vf of the output voltage Vo decreases below the reference voltage Vr1) the control unit 42 operates the converter unit 11a, 11b, or 11c, through which the smallest current flows, to supply current and increase the output voltage Vo.

The multi-phase DC—DC converter 40 of the third embodiment has the advantages described below.

The control unit 42 compares the output currents Ia, Ib, and Ic of the converter units 11a, 11b, and 11c with one another. Based on the comparison result, the control unit 42 generates control signals so that a converter unit through which the smallest output current flows is operated. Thus, when the output voltage Vo decreases due to a sudden change in the load while one converter unit (e.g., the first converter unit 11a) is operating to supply the current Ia, another converter unit (e.g., the second converter unit 11b), through which a smaller output current flows, is operated. Thus, a plurality of converter units are operated sequentially without requiring their timings to be controlled. The DC—DC converter 40 has improved responsiveness to a change in the output voltage Vo.

Figure 7:
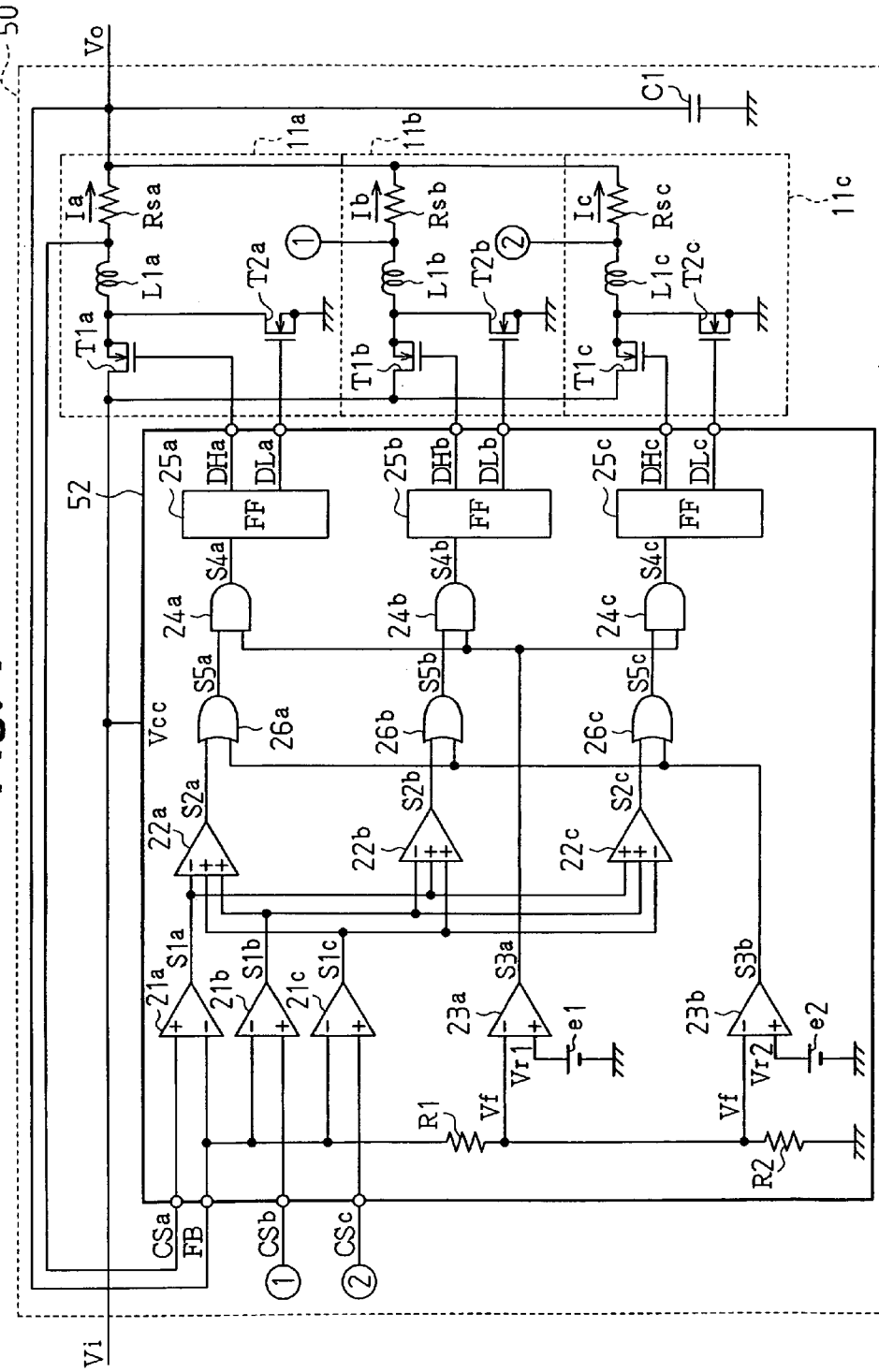
FIG. 7 is a schematic circuit diagram of a DC—DC converter according to a fourth embodiment of the present invention.

FIG. 7 is a schematic circuit diagram of a multi-phase DC—DC converter 50 according to a fourth embodiment of the present invention.

The DC—DC converter 50 is a self-excited multi-phase DC—DC converter having three phases. The DC—DC converter 50 includes three converter units 11a, 11b, and 11c, one control unit 52, and a smoothing capacitor C1.

The control unit 52 includes three voltage amplifiers 21a, 21b, and 21c, three comparators 22a, 22b, and 22c, two voltage comparators 23a and 23b, two reference power supplies e1 and e2, two resistors R1 and R2, three AND circuits 24a, 24b, and 24c, three one-shot flip-flop circuits (hereafter referred to as "FF circuits") 25a, 25b, and 25c, and three OR circuits 26a, 26b, and 26c. The control unit 52 has a configuration in which the second voltage comparator 23b, the reference power supply e2, and the OR circuits 26a, 26b, and 26c are added to the control unit 42 of the third embodiment.

The OR circuits 26a, 26b, and 26c are connected between the comparators 22a, 22b, and 22c, and the AND circuits 24a, 24b, and 24c, respectively. The OR circuits 26a, 26b, and 26c are provided with a comparison signal S3b from the second voltage comparator 23b. More specifically, the OR circuit 26a receives a comparison signal S2a from the comparator 22a and the comparison signal S3b from the second voltage comparator 23b and provides the AND circuit 24a with an output signal. The OR circuit 26b receives a comparison signal S2b from the comparator 22b and the comparison signal S3b from the second voltage comparator 23b and provides the AND circuit 24b with an output signal. The OR circuit 26c receives a comparison signal S2c from the comparator 22c and the comparison signal S3b from the second voltage comparator 23b and provides the AND circuit 24c with an output signal.

When the output voltage Vo is lower than a second predetermined voltage (the divided voltage Vf of the output voltage Vo is lower than the second reference voltage Vr2 supplied to the second voltage comparator 23b), all the OR circuits 26a, 26b, and 26c generate H level output signals S5a, S5b, and S5c, respectively. Thus, the control unit 52 operates all the converter units 11a, 11b, and 11c to supply the load with the currents Ia, Ib, and Ic when the output voltage Vo decreases below the second predetermined voltage.

The multi-phase DC—DC converter 50 of the fourth embodiment has the advantages described below.

The control unit 52 includes the second voltage comparator 23b, which compares the output voltage Vo (divided voltage Vf) with the second reference voltage Vr2 that is lower than the first reference voltage Vr1. The control unit 52 operates the converter units 11a, 11b, and 11c synchronously in accordance with the comparison signal S3b of the second voltage comparator 23b. As a result, a greater output current is supplied to the load as compared with when the converter units 11a, 11b, and 11c are operated sequentially. Thus, even when the output voltage Vo decreases due to a sudden change of the load, the output voltage Vo increases within a short period of time.

Figure 8:
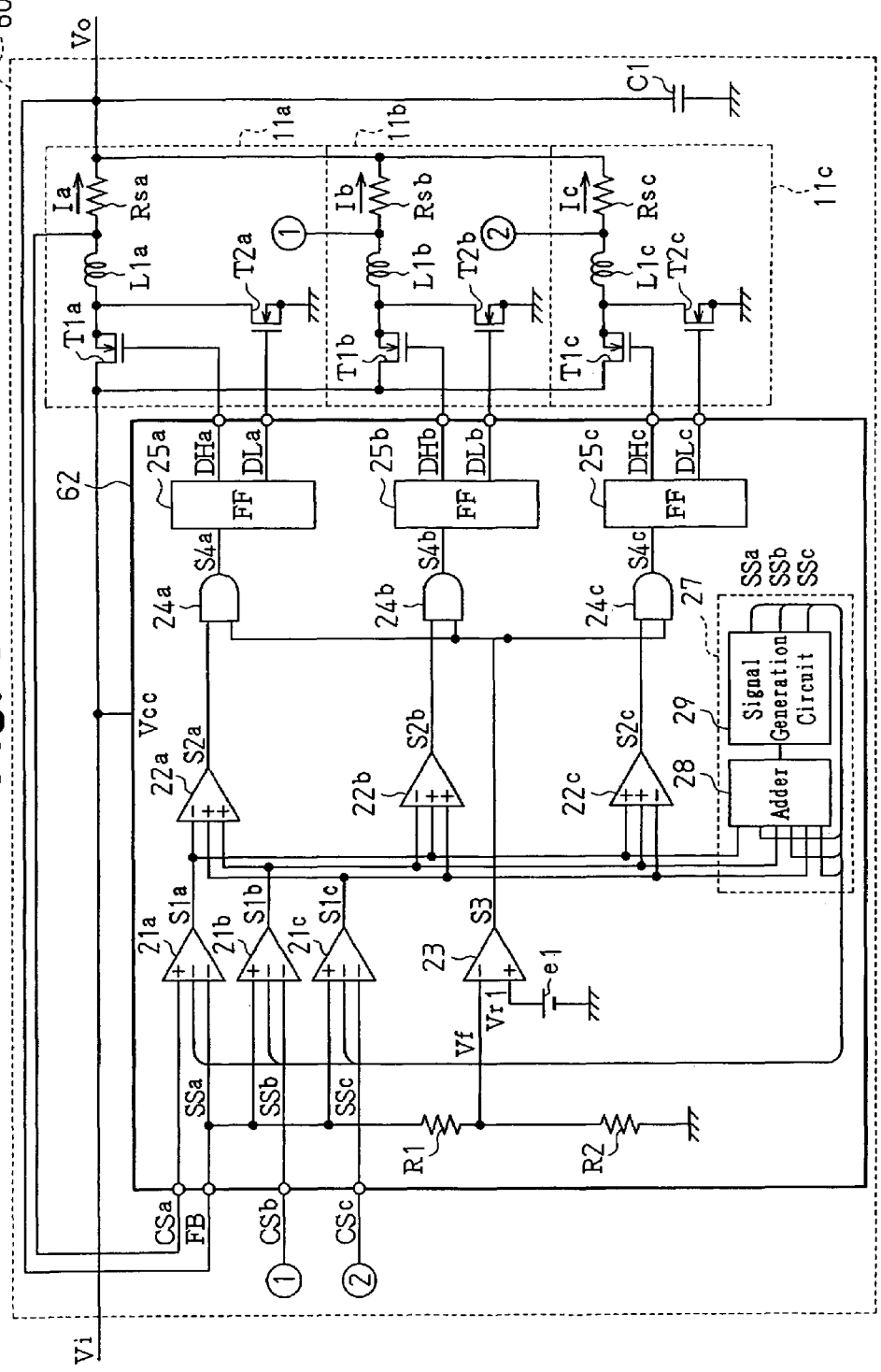
FIG. 8 is a schematic block diagram of a DC—DC converter according to a fifth embodiment of the present invention.

FIG. 8 is a schematic circuit diagram of a multi-phase DC—DC converter 60 according to a fifth embodiment of the present invention.

The DC—DC converter 60 is a self-excited multi-phase DC—DC converter having three phases. The DC—DC converter 60 includes three converter units 11a, 11b, and 11c, one control unit 62, and a smoothing capacitor C1.

The control unit 62 includes three voltage amplifiers 21a, 21b, and 21c, three comparators 22a, 22b, and 22c, a voltage comparator 23, a reference power supply e1, two resistors R1 and R2, three AND circuits 24a, 24b, and 24c, three one-shot flip-flop circuits (hereafter referred to as "FF circuits") 25a, 25b, and 25c, and a degeneracy operation control circuit 27.

Each of the voltage amplifiers 21a, 21b, and 21c has one non-inversion input terminal and two inversion input terminals and amplifies the voltage difference between the smaller one of the voltages of signals provided to the two inversion input terminals and the voltage of a signal provided to the non-inversion input terminal.

The voltage amplifier 21a has a non-inversion input terminal for receiving a signal CSa fed back from the first converter unit 11a, a first inversion input terminal for receiving a signal FB, and a second inversion input terminal for receiving a first degeneracy control signal SSa from the degeneracy operation control circuit 27, which will be described later. The voltage amplifier 21a amplifies the voltage difference between the lower one of the voltages of the signal CSa and the degeneracy control signal SSa and the voltage of the signal FB to generate an amplification signal S1a. When the voltage of the degeneracy control signal SSa is higher than the voltage of the signal CSa, the voltage amplifier 21a generates the amplification signal S1a having a voltage corresponding to the voltage difference between the signal CSa and the signal FB. The voltage of the amplification signal S1a corresponds to a voltage difference between the two terminals of the current detection resistor Rsa (i.e., the value of the current Ia flowing through the current detection resistor Rsa).

When the voltage of the first degeneracy control signal SSa is lower than the voltage of the signal CSa, the voltage amplifier 21a generates the amplification signal S1a having a voltage corresponding to the voltage difference between the degeneracy control signal SSa and the signal FB. The voltage of the degeneracy control signal SSa is controlled by the degeneracy operation control circuit 27. The degeneracy operation control circuit 27 controls the voltage amplifier 21a so that a current according to the voltage difference between the degeneracy control signal SSa and the signal FB flows through the current detection resistor Rsa of the converter unit 11a.

The voltage amplifier 21b has a non-inversion input terminal for receiving a signal CSb fed back from the second converter unit 11b, a first inversion input terminal for receiving the signal FB, and a second inversion input terminal for receiving a second degeneracy control signal SSb from the degeneracy operation control circuit 27. The voltage amplifier 21b amplifies a voltage difference between the lower one of the voltages of the signal CSb and the degeneracy control signal SSb and the voltage of the signal FB to generate an amplification signal S1b. When the voltage of the degeneracy control signal SSb is higher than the voltage of the signal CSb, the voltage amplifier 21b generates the amplification signal S1b having a voltage corresponding to the voltage difference between the signal CSb and the signal FB. The voltage of the amplification signal S1b corresponds to the voltage difference between the two terminals of the current detection resistor Rsb (i.e., the value of the current Ib flowing through the current detection resistor Rsb).

When the voltage of the second degeneracy control signal SSb is lower than the voltage of the signal CSb, the voltage amplifier 21b generates the amplification signal S1b having a voltage corresponding to the voltage difference between the degeneracy control signal SSb and the signal FB. The voltage of the degeneracy control signal SSb is controlled by the degeneracy operation control circuit 27. The degeneracy operation control circuit 27 controls the voltage amplifier 21b so that a current according to the voltage difference between the degeneracy control signal SSb and the signal FB flows through the current detection resistor Rsb of the converter unit 11b.

The voltage amplifier 21c has a non-inversion input terminal for receiving a signal CSc fed back from the third converter unit 11c, a first inversion input terminal for receiving the signal FB, and a second inversion input terminal for receiving a third degeneracy control signal SSc from the degeneracy operation control circuit 27. The voltage amplifier 21c amplifies the voltage difference between the lower one of the voltages of the signal CSc and the degeneracy control signal SSc and the voltage of the signal FB to generate an amplification signal S1c. When the voltage of the degeneracy control signal SSc is higher than the voltage of the signal CSc, the voltage amplifier 21c generates the amplification signal S1c having a voltage corresponding to the voltage difference between the signal CSc and the signal FB. The voltage of the amplification signal S1c corresponds to the voltage difference between the two terminals of the current detection resistor Rsc (i.e., the value of the current Ic flowing through the current detection resistor Rsc).

When the voltage of the third degeneracy control signal SSc is lower than the voltage of the signal CSc, the voltage amplifier 21c generates the amplification signal S1c having a voltage corresponding to the voltage difference between the degeneracy control signal SSc and the signal FB. The voltage of the degeneracy control signal SSc is controlled by the degeneracy operation control circuit 27. The degeneracy operation control circuit 27 controls the voltage amplifier 21c so that a current according to the voltage difference between the degeneracy control signal SSc and the signal FB flows through the current detection resistor Rsc of the converter unit 11c.

The degeneracy operation control circuit 27 performs a degeneracy operation for decreasing the number of converter units that perform a switching operation. By decreasing the number of converter units that are to be operated, power consumption is reduced. That is, portable devices having a DC—DC converter are required to extend their battery-operable time. Further, personal computers equipped with a plurality of devices such as a DVD drive or personal computers that operate using a high-speed clock signal are required to reduce their power consumption while the devices are not in use or while a simple processing is being executed. To meet such requirements, the degeneracy operation control circuit 27 changes the number of converter units to be operated based on the value of the output current.

The degeneracy operation control circuit 27 receives the signals S1a, S1b, and S1c from the voltage amplifiers 21a, 21b, and 21c. Based on the signals S1a, S1b, and S1c, the degeneracy operation control circuit 27 generates degeneracy control signals SSa, SSb, and SSc.

The degeneracy operation control circuit 27 generates the degeneracy control signals SSa, SSb, and SSc so that some of the converter units 11a, 11b, and 11c are inactivated when the supply of a small current to the load is permitted based on the signals S1a, S1b, and S1c. The current supplied to the load is the total of the output currents of the converter units 11a, 11b, and 11c (i.e., a total of the currents Ia, Ib, and Ic flowing through the current detection resistors Rsa, Rsb, and Rsc of the converter units 11a, 11b, and 11c). When the DC—DC converter 60 has an m number of converter units, the DC—DC converter 60 operates as a multi-phase DC—DC converter having an n number of converter units (where n is an integer and satisfies $1 \leq n \leq m$) according to the amount of current that is to be supplied to the load.

In detail, the degeneracy operation control circuit 27 includes an adder 28 and a signal generation circuit 29. The adder 28 receives the amplification signals S1a, S1b, and S1c of the voltage amplifiers 21a, 21b, and 21c and the degeneracy control signals SSa, SSb, and SSc. Based on the result of comparison between the voltage of each amplification signal and the voltage of the corresponding degeneracy control signal, the adder 28 adds the voltage of each signal having a lower voltage to generate a sum signal. For example, when the voltages of the amplification signals S1a, S1b, and S1c are lower than the voltages of the degeneracy control signals SSa, SSb, and SSc, respectively, the adder 28 adds the voltages of the amplification signals S1a, S1b, and S1c, to generate a sum signal having a voltage resulting from the addition. Further, when, for example, the voltage of the amplification signal S1a is higher than the voltage of the degeneracy control signal SSa, the adder 28 adds the voltages of the degeneracy control signal SSa and the amplification signals S1b and S1c to generate a sum signal.

The signal generation circuit 29 stores predetermined threshold value voltages. The signal generation circuit 29 compares the sum signal obtained by the adder 28 (the addition result of the signals S1a, S1b, and S1c) with a threshold value voltage. The signal generation circuit 29 in the fifth embodiment stores two different threshold value voltages (a first threshold value voltage Vt1 and a second threshold value voltage Vt2) and compares the addition result with each of the threshold value voltages Vt1 and Vt2. When the addition result is greater than each of the two threshold value voltages Vt1 and Vt2, the signal generation circuit 29 generates the degeneracy control signals SSa, SSb, and SSc having a first voltage (e.g., a power supply voltage Vcc), which is higher than possible voltages of the signals CSa, CSb, and CSc. The voltages of the degeneracy control signals SSa, SSb, and SSc are higher than the voltages of the signals CSa, CSb, and CSc, which are fed back. Each of the voltage amplifiers 21a, 21b, and 21c amplifies a voltage difference between the signal CSa, CSb, or CSc and the signal FB to generate the amplification signal S1a, S1b, or S1c. In this case, the converter units 11a, 11b, and 11c are operated in the same manner as when controlled by the control unit 42 of the third embodiment.

When the addition result is greater than the threshold value voltage Vt and is smaller than the threshold value voltage Vt2 (where Vt1 is smaller than Vt2), the signal generation circuit 29 sets the voltage of one of the degeneracy control signals SSa, SSb, and SSc (e.g., the degeneracy control signal SSa) at a second voltage, which is lower than possible voltages of the signals CSa, CSb, and CSc (e.g., ground GND), and sets the voltages of the other degeneracy control signals SSb and SSc at the first voltage. As a result, the voltage amplifier 21a amplifies the voltage difference between the degeneracy control signal SSa and the signal FB to generate the amplification signal S1a. The voltage amplifiers 21b and 21c amplify the voltage differences between the signals CSb and the signal FB and between the signal CSc and the signal FB to generate the amplification signals S1b and S1c, respectively. The voltage amplifier 21a generates an amplification signal S1a corresponding to the case in which a greater current is flowing through the converter unit 11a as compared with currents flowing through the converter units 11b and 11c. The comparator 22a generates an L level comparison signal S2a. The voltage amplifier 21b generates a signal S1b having a voltage level corresponding to the current Ib flowing through the converter unit 11b. The voltage amplifier 21c generates a signal S1c having a voltage level corresponding to the current Ic flowing through the converter unit 11c. Thus, when the output voltage Vo decreases below a predetermined voltage, the current Ib flowing through the converter unit 11b and the current Ic flowing through the converter unit 11c cause the second FF circuit 25b or the third FF circuit 25c to be operated. As a result, the output voltage Vo increases. In other words, the DC—DC converter 60 operates as a multi-phase DC—DC converter having two phases according to the output current.

When the addition result is smaller than each of the threshold value voltages Vt1 and Vt2, the signal generation circuit 29 sets the voltages of two of the degeneracy control signals SSa to SSc (e.g., the degeneracy control signals SSa and SSb) at the second voltage and sets the voltage of the other degeneracy control signal SSc at the first voltage. Thus, the voltage amplifiers 21a and 21b amplify the voltage differences between the degeneracy control signal SSa and the signal FB and between the degeneracy control signal SSb and the signal FB to generate the amplification signals S1a and S1b, respectively. The voltage amplifier 21c amplifies the voltage difference between the signal CSc and the signal FB to generate the amplification signal S1c. The voltage amplifiers 21a and 21b generate amplification signals S1a and S1b corresponding to when greater currents are flowing through the converter units 11a and 11b as compared with the current flowing through the converter unit 11c. The comparators 22a and 22b generate L level comparison signals S2a and S2b, respectively. The voltage amplifier 21c generates a signal S1c having a voltage level corresponding to the current Ic flowing through the converter unit 11c. Thus, when the output voltage Vo decreases below a predetermined voltage, the third FF circuit 25c is operated. As a result, the output voltage Vo increases. In other words, the DC—DC converter 60 operates as a single-phase DC—DC converter in accordance with the output current.

The multi-phase DC—DC converter 60 of the fifth embodiment has the advantages described below.

The control unit 62 includes the degeneracy operation control circuit 27, which generates the degeneracy control signals SSa to SSc for inactivating the number of converter units corresponding to the current value based on the output current (the total of the output currents Ia, Ib, and Ic of the converter units 11a, 11b, and 11c). The control unit 62 inactivates the converter units 11a, 11b, and 11c in accordance with the degeneracy control signals SSa, SSb, and SSc. Thus, when the supply of a small current to the load is permitted, unnecessary converter units are inactivated. In this way, power consumption is reduced.

Figure 9:
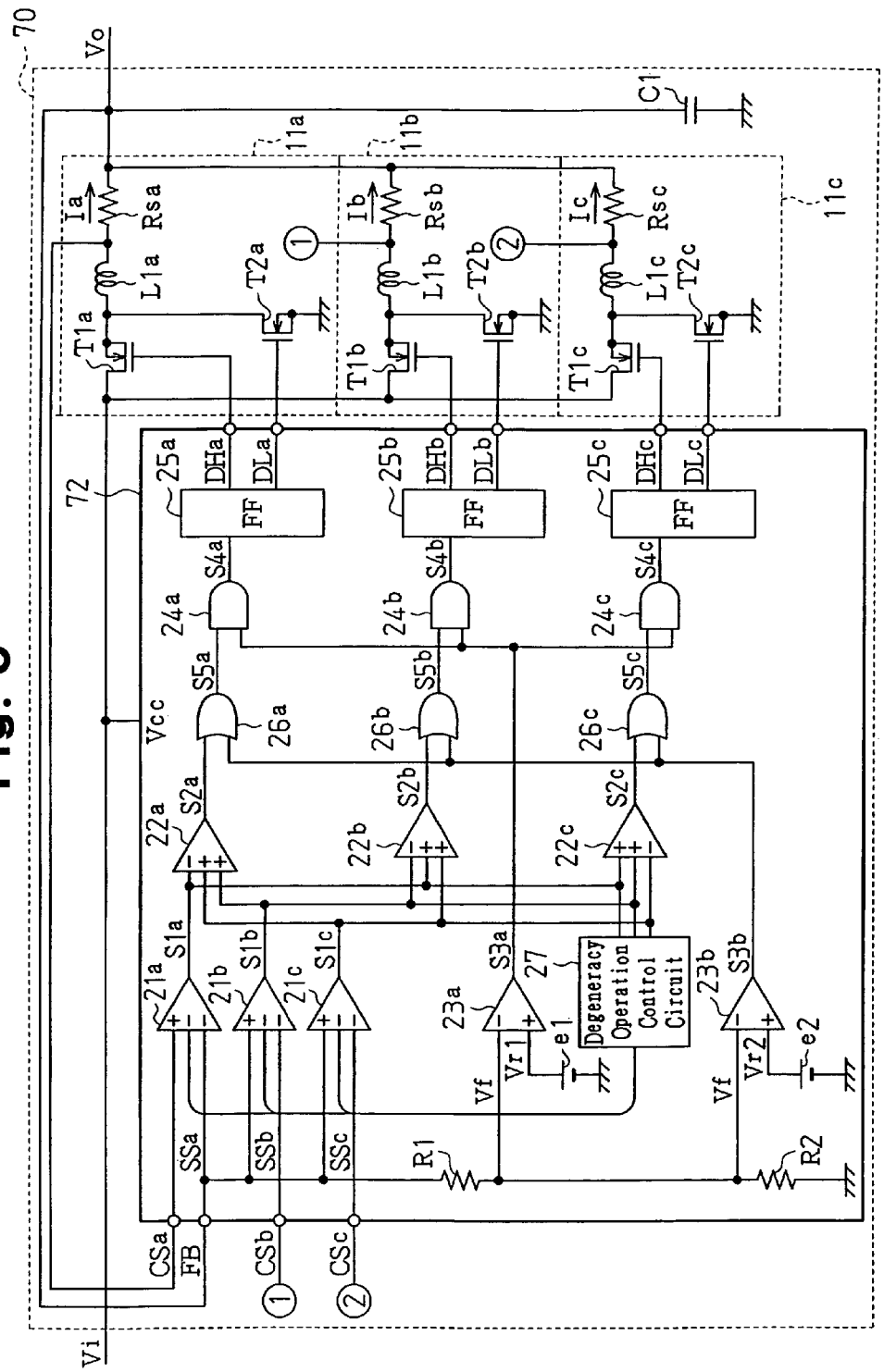
FIG. 9 is a schematic circuit diagram of a DC—DC converter according to a sixth embodiment of the present invention.

FIG. 9 is a schematic circuit diagram of a multi-phase DC—DC converter 70 according to a sixth embodiment of the present invention.

The DC—DC converter 70 is a self-excited multi-phase DC—DC converter having three phases. The DC—DC converter 70 includes three converter units 11a, 11b, and 11c, one control unit 72, and a smoothing capacitor C1.

The control unit 72 includes three voltage amplifiers 21a, 21b, and 21c, three comparators 22a, 22b, and 22c, two voltage comparators 23a and 23b, two reference power supplies e1 and e2, two resistors R1 and R2, three AND circuits 24a, 24b, and 24c, two one-shot flip-flop circuits (hereafter referred to as "FF circuits") 25a and 25b, three OR circuits 26a, 26b, and 26c, and a degeneracy operation control circuit 27. The control unit 72 of the sixth embodiment has a configuration in which the voltage comparator 23b, the reference power supply e2, and the OR circuits 26a, 26b, and 26c of the fourth embodiment are added to the control unit 62 of the fifth embodiment.

The OR circuits 26a, 26b, and 26c are connected between the comparators 22a, 22b, and 22c, and the AND circuits 24a, 24b, and 24c, respectively. The OR circuits 26a, 26b, and 26c are provided with a comparison signal S3b of the second voltage comparator 23b. More specifically, the OR circuit 26a receives a comparison signal S2a from the comparator 22a and the comparison signal S3b from the second voltage comparator 23b and provides the AND circuit 24a with an output signal. The OR circuit 26b receives a comparison signal S2b from the comparator 22b and the comparison signal S3b from the second voltage comparator 23b and provides the AND circuit 24b with an output signal. The OR circuit 26c receives a comparison signal S2c from the comparator 22c and the comparison signal S3b from the second voltage comparator 23b and provides the AND circuit 24c with an output signal.

The second voltage comparator 23b compares a divided voltage Vf, which is obtained by the resistors R1 and R2 dividing the signal FB, with a second reference voltage Vr2, which is lower than a first reference voltage Vr1. Based on the comparison result, the second voltage comparator 23b generates an L level comparison signal S3b when the divided voltage Vf is higher than the reference voltage Vr2 and generates an H level comparison signal S3b when the divided voltage Vf is lower than the reference voltage Vr2.

When the output voltage Vo is lower than a first predetermined voltage (the divided voltage Vf of the output voltage Vo is lower than the first reference voltage Vr1) and is higher than a second predetermined voltage (the divided voltage Vf of the output voltage Vo is higher than the second reference voltage Vr2), the OR circuits 26a, 26b, and 26c generate signals S5a, S5b, and S5c having substantially the same level as the comparison signals of the comparators 22a, 22b, and 22c, respectively. Thus, in the same manner as in the fourth embodiment, the control unit 72 operates an n number of converter units (where n is an integer and satisfies 1≦n≦3) to supply the load with the output voltage Vo according to the output current. In this way, the DC—DC converter 70 operates as a multi-phase DC—DC converter having n phases.

When the output voltage Vo is lower than the second predetermined voltage (the divided voltage Vf of the output voltage Vo is lower than the second reference voltage Vr2), all the OR circuits 26a, 26b, and 26c generate H level signals S5a, S5b, and S5c, respectively. Thus, the control unit 72 operates all the converter units 11a, 11b, and 11c synchronously to supply the load with the currents Ia, Ib, and Ic when the output voltage Vo decreases below the second predetermined voltage.

The multi-phase DC—DC converter 70 of the sixth embodiment has the advantages described below.

The control unit 72 includes the second voltage comparator 23b, which compares the output voltage Vo (divided voltage Vf) with the second reference voltage Vr2 that is lower than the first reference voltage Vr1, and generates the comparison signal S3b. The control unit 72 operates the converter units 11a, 11b, and 11c synchronously based on the comparison signal S3b of the second voltage comparator 23b. In this way, the control unit 72 inactivates unnecessary converter units in accordance with the amount of current to be supplied to the load in order to reduce power consumption. Further, when the load suddenly changes, the control unit 72 operates all the converter units 11a to 11c synchronously so that the output current Vo increases within a short period of time.

Figure 10:
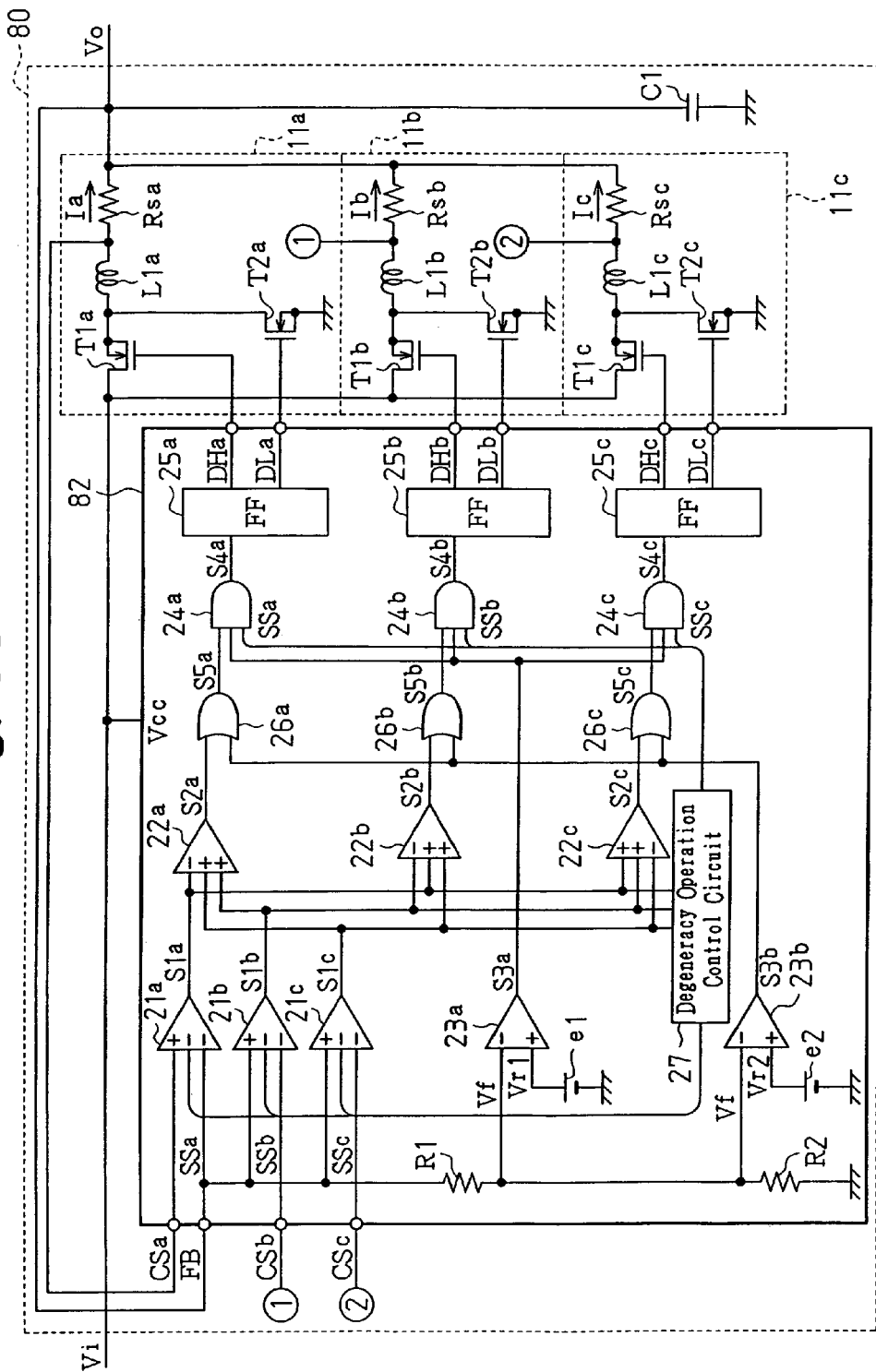
FIG. 10 is a schematic block diagram of a DC—DC converter according to a seventh embodiment of the present invention.

FIG. 10 is a schematic circuit diagram of a multi-phase DC—DC converter 80 according to a seventh embodiment of the present invention.

The DC—DC converter 80 is a self-excited multi-phase DC—DC converter having three phases. The DC—DC converter 80 includes three converter units 11a, 11b, and 11c, one control unit 82, and a smoothing capacitor C1.

The control unit 82 includes three voltage amplifiers 21a, 21b, and 21c, three comparators 22a, 22b, and 22c, two voltage comparators 23a and 23b, two reference power supplies e1 and e2, two resistors R1 and R2, three AND circuits 24a, 24b, and 24c, three one-shot flip-flop circuits (hereafter referred to as "FF circuits") 25a, 25b, and 25c, three OR circuits 26a, 26b, and 26c, and a degeneracy operation control circuit 27.

Each of the AND circuits 24a, 24b, and 24c is a three-input element that receives an output signal S5a, S5b, or S5c, a comparison signal S3a, and a degeneracy control signal SSa, SSb, or SSc. The AND circuit 24a receives the output signal S5a from the OR circuit 26a, the comparison signal S3a from the voltage comparator 23a, and the degeneracy control signal SSa from the degeneracy operation control circuit 27. Based on the comparison result of the comparator 22a, the OR circuit 26a generates an H level signal S5a when a current Ia supplied to the load from the converter unit 11a is smaller than currents Ib and Ic supplied to the load from the other converter units 11b and 11c or when an output voltage Vo is lower than a second predetermined voltage. The voltage comparator 23a generates an H level comparison signal S3a when the output voltage Vo is lower than a first predetermined voltage. The degeneracy operation control circuit 27 generates an H level degeneracy control signal SSa for operating the converter unit 11a or an L level degeneracy control signal SSa for inactivating the converter unit 11a based on the amount of current that is to be supplied to the load.

The AND circuit 24a generates an H level signal S4a when the degeneracy control signal SSa indicates that the converter unit 11a is operable, the output voltage Vo is lower than the first predetermined voltage, and the current Ia is smaller than the currents Ib and Ic. The AND circuit 24a generates an H level signal S4a when the degeneracy control signal SSa indicates that the converter unit 11a is operable and the output voltage Vo is lower than the second predetermined voltage.

The AND circuit 24b receives the output signal S5b from the OR circuit 26b, the comparison signal S3a from the voltage comparator 23a, and the degeneracy control signal SSb from the degeneracy operation control circuit 27. Based on the comparison result of the comparator 22b, the OR circuit 26b generates an H level signal S5b when the current Ib supplied to the load from the converter unit 11b is smaller than the currents Ia and Ic supplied to the load from the other converter units 11a and 11c or when the output voltage Vo is lower than the second predetermined voltage. The voltage comparator 23a generates an H level comparison signal S3a when the output voltage Vo is lower than the first predetermined voltage. The degeneracy operation control circuit 27 generates an H level degeneracy control signal SSb for operating the converter unit 11b or an L level degeneracy control signal SSb for inactivating the converter unit 11b based on the amount of current that is to be supplied to the load.

The AND circuit 24b generates an H level signal S4b when the degeneracy control signal SSb indicates that the converter unit 11b is operable, the output voltage Vo is lower than the first predetermined voltage, and the current Ib is smaller than the currents Ia and Ic. The AND circuit 24b generates an H level signal S4b when the degeneracy control signal SSb indicates that the converter unit 11b is operable and the output voltage Vo is lower than the second predetermined voltage.

The AND circuit 24c receives the output signal S5c from the OR circuit 26c, the comparison signal S3a from the voltage comparator 23a, and the degeneracy control signal SSc from the degeneracy operation control circuit 27. Based on the comparison result of the comparator 22c, the OR circuit 26c generates an H level signal S5c when the current Ic supplied to the load from the converter unit 11c is smaller than the currents Ia and Ib supplied to the load from the other converter units 11a and 11b or when the output voltage Vo is lower than the second predetermined voltage. The voltage comparator 23a generates an H level comparison signal S3a when the output voltage Vo is lower than the first predetermined voltage. The degeneracy operation control circuit 27 generates an H level degeneracy control signal SSc for operating the converter unit 11c or an L level degeneracy control signal SSc for inactivating the converter unit 11c based on the amount of current that is to be supplied to the load.

The AND circuit 24c generates an H level signal S4c when the degeneracy control signal SSc indicates that the converter unit 11c is operable, the output voltage Vo is lower than the first predetermined voltage, and the current Ic is smaller than the currents Ia and Ib. The AND circuit 24c generates an H level signal S4c when the degeneracy control signal SSc indicates that the converter unit 11c is operable and the output voltage Vo is lower than the second predetermined voltage.

In this way, the control unit 82 controls an n number of the converter units (where n is an integer and satisfies $1 \leq n \leq 3$) to be operable in accordance with the amount of current that is to be supplied to the load. When the output voltage Vo decreases below the first predetermined voltage, the control unit 82 sequentially operates the converter units. When the output voltage Vo decreases below the second predetermined voltage due to a sudden change in the load, the control unit 82 synchronously operates the operable converter units selected by the degeneracy operation control circuit 27.

The multi-phase DC—DC converter 80 of the seventh embodiment has the advantages described below.

The control unit 82 includes the second voltage comparator 23b, which compares the output voltage Vo (divided voltage Vf) with the second reference voltage Vr2 that is lower than the first reference voltage Vr1. The AND circuits 24a, 24b, and 24c receive the degeneracy control signals SSa, SSb, and SSc, respectively. Thus, the converter units are selectively inactivated in accordance with the amount of current that is to be supplied to the load in order to reduce power consumption. When the load suddenly changes, the control unit 82 synchronously operates the operable converter units, which are selected based on the degeneracy control signals SSa, SSb, and SSc, so that the output current Vo increases within a short period of time.

It should be apparent to those skilled in the art that the present invention may be embodied in many other specific forms without departing from the spirit or scope of the invention. Particularly, it should be understood that the present invention may be embodied in the following forms.

The application of the present invention is not limited to a multi-phase DC—DC converter having two or three phases. The present invention may also be applied to multi-phase converters having four or more phases.

In the first and second embodiments, the control unit 12 may include two comparators in lieu of the comparator 22 for generating complementary signals. In this case, the first comparator has an inversion input terminal for receiving the amplification signal S1a from the voltage amplifier 21a and a non-inversion input terminal for receiving the amplification signal S1b from the voltage amplifier 21b. The second comparator has an inversion input terminal for receiving the amplification signal S1b from the voltage amplifier 21b and a non-inversion input terminal for receiving the amplification signal S1a from the voltage amplifier 21a. The first and second comparators respectively generate the comparison signals S2a and S2b, which are complementary to each other.

In the fifth to seventh embodiments, instead of providing degeneracy control signals to all the voltage amplifiers 21, a degeneracy control signal may be provided to at least one of the voltage amplifiers 21. This inactivates the converter unit corresponding to the voltage amplifier 21 provided with the degeneracy control signal. Alternatively, a degeneracy control signal may not be provided to at least one of the voltage amplifiers 21. In this case, the converter unit corresponding to the voltage amplifier 21 that is not provided with the degeneracy control signal is operated to supply the output voltage Vo to the load.

In the fifth to seventh embodiments, instead of generating the first to third degeneracy control signals SSa to SSc using the degeneracy operation control circuit 27, at least one of the degeneracy control signals SSa to SSc may be provided from an external device. For example, an electronic device may include a semiconductor device (e.g., a microcomputer) for managing power supplies, and the semiconductor device may provide the degeneracy control signals SSa, SSb, and SSc. Alternatively, when the load is a microcomputer, each converter unit may be operated in response to an output request signal generated according to a program executed by the microcomputer.

The degeneracy operation is performed to change the amount of current in accordance with the load. However, the number of converter units that are operated during the degeneracy operation may be set using a switch.

The present examples and embodiments are to be considered as illustrative and not restrictive, and the invention is not to be limited to the details given herein, but may be modified within the scope and equivalence of the appended claims.

What is claimed is:

1. A multi-phase DC—DC converter comprising:
   an output terminal;
   a plurality of converter units, each receiving an input voltage and generating an output voltage for said output terminal; and
   a control unit connected to the plurality of converter units, the control unit including:
      a first voltage comparator for comparing the output voltage with a first reference voltage to generate a first voltage comparison signal indicating the comparison result;
      a current comparison circuit for comparing a plurality of output currents that are in accordance with the output voltages of the converter units to generate a plurality of current comparison signals respectively corresponding to the converter units; and
      a signal generation circuit, connected to the first voltage comparator and the current comparison circuit, for generating a plurality of control signals for respectively controlling the converter units so that a converter unit through which a smaller output current flows is operated in accordance with the current comparison signals generated by the current comparison circuit when the first voltage comparison signal indicates that the output voltage is lower than the first reference voltage.

2. The multi-phase DC—DC converter according to claim 1, wherein each of the converter units includes a current detection resistor, and the current comparison circuit includes:
   a plurality of voltage amplifiers respectively connected to the converter units, each voltage amplifier amplifying a voltage difference between two terminals of the current detection resistor included in the corresponding converter unit to generate an amplified voltage; and
   a comparator, connected to the plurality of voltage amplifiers, for comparing a plurality of voltages to generate the current comparison signals.

3. The multi-phase DC—DC converter according to claim 1, wherein the signal generation circuit includes:
   a plurality of AND circuits connected to the first voltage comparator and the current comparison circuit, each AND circuit receiving the current comparison signal for the corresponding converter unit and the first voltage comparison signal to generate a logical AND output signal; and a plurality of one-shot flip-flop circuits respectively connected to the AND circuits, each of the one-shot flip-flop circuits generating a control signal for controlling the corresponding converter unit in response to the logical AND output signal of the corresponding AND circuit.

4. The multi-phase DC—DC converter according to claim 1, wherein:

the control unit includes a second voltage comparator for comparing the output voltage with a second reference voltage that is lower than the first reference voltage to generate a second voltage comparison signal; and when the second voltage comparison signal indicates that the output voltage at the output terminal is lower than the second reference voltage, the signal generation circuit invalidates the current comparison signals of the current comparison circuit and generates a plurality of control signals to synchronously operate the converter units.

5. The multi-phase DC—DC converter according to claim 4, wherein the signal generation circuit includes:

a plurality of OR circuits connected to the current comparison circuit and the second voltage comparator, each OR circuit receiving the current comparison signal of the corresponding converter unit and the second voltage comparison signal to generate a logical OR output signal;

a plurality of AND circuits connected to the first voltage comparator and respectively to the OR circuits, each AND circuit receiving the logical OR output signal of the corresponding OR circuit and the first voltage comparison signal to generate a logical AND output signal; and a plurality of one-shot flip-flop circuits respectively connected to the AND circuits, each one-shot flip-flop circuit generating the control signal for controlling the corresponding converter unit in response to the logical AND output signal of the corresponding AND circuit.

6. The multi-phase DC—DC converter according to claim 1, wherein:

the control unit includes a degeneracy operation control circuit for adding the output currents of the converter units to obtain a total output current and generating a plurality of degeneracy control signals for selectively inactivating the converter units based on the total output current; and the current comparison circuit generates the current comparison signals for selectively inactivating the plurality of converter units in accordance with the degeneracy control signals.

7. The multi-phase DC—DC converter according to claim 6, wherein the degeneracy operation control circuit includes:

an adder for adding the output currents of the converter units to generate a sum signal; and a signal generation circuit, connected to the adder, for comparing the sum signal with a predetermined threshold value and generating the degeneracy control signals, each of which indicates a current greater than a current flowing through the corresponding converter unit based on the comparison result;

wherein the current comparison circuit compares the current flowing through each of the converter units with a current indicated by the corresponding degeneracy control signal to generate the current comparison signals so that the converter unit through which a greater output current flows is inactivated.

8. The multi-phase DC—DC converter according to claim 6, wherein the control unit includes a second voltage comparator for comparing the output voltage with a second reference voltage that is lower than the first reference voltage to generate a second voltage comparison signal; and when the second voltage comparison signal indicates that the output voltage is lower than the second reference voltage, the signal generation circuit invalidates the current comparison signals of the current comparison circuit and the degeneracy control signals and generates a plurality of control signals to synchronously operate the converter units.

9. The multi-phase DC—DC converter according to claim 6, wherein the control unit includes a second voltage comparator for comparing the output voltage with a second reference voltage that is lower than the first reference voltage to generate a second voltage comparison signal; and when the second voltage comparison signal indicates that the output voltage at the output terminal is lower than the second reference voltage, the signal generation circuit invalidates the current comparison signals of the current comparison circuit and generates a plurality of control signals to synchronously operate operable converter units selected by the degeneracy control signals.

10. The multi-phase DC—DC converter according to claim 9, wherein the signal generation circuit includes:

a plurality of OR circuits connected to the current comparison circuit and the second voltage comparator, each OR circuit receiving the current comparison signal of the corresponding converter unit and the second voltage comparison signal to generate a logical OR output signal;

a plurality of AND circuits connected to the first voltage comparator and the degeneracy operation control circuit and respectively to the OR circuits, each AND circuit receiving the first voltage comparison signal, the corresponding degeneracy control signal, and the corresponding logical OR output signal to generate a logical AND output signal; and a plurality of one-shot flip-flop circuits respectively connected to the plurality of AND circuits, each one-shot flip-flop circuit generating the control signal for controlling the corresponding converter unit in response to the logical AND output signal generated by the corresponding AND circuit.

11. A control circuit for controlling a multi-phase DC—DC converter that includes an output terminal and a plurality of converter units, each receiving an input voltage and generating an output voltage for the output terminal of the DC—DC converter, the circuit comprising:

a first voltage comparator for comparing the output voltage with a first reference voltage to generate a first voltage comparison signal indicating the comparison result;

a current comparison circuit for comparing a plurality of output currents that are in accordance with the output voltages generated by the converter units to generate a plurality of current comparison signals respectively corresponding to the converter units; and a signal generation circuit, connected to the first voltage comparator and the current comparison circuit, for generating a plurality of control signals for respectively controlling the converter units so that a converter unit through which a smaller output current flows is operated in accordance with the current comparison signals generated by the current comparison circuit when the first voltage comparison signal indicates that the output voltage is lower than the first reference voltage.

12. The control circuit according to claim 11, further comprising:
a second voltage comparator for comparing the output voltage with a second reference voltage that is lower than the first reference voltage to generate a second voltage comparison signal;
wherein when the second voltage comparison signal indicates that the output voltage is lower than the second reference voltage, the signal generation circuit invalidates the current comparison signals of the current comparison circuit and generates a plurality of control signals to synchronously operate the converter units.

13. The control circuit according to claim 11, further comprising:
a degeneracy operation control circuit for adding the output currents of the converter units to obtain a total output current and generating a plurality of degeneracy control signals for selectively inactivating the converter units based on the total output current;
wherein the current comparison circuit generates the current comparison signals for selectively inactivating the converter units in accordance with the degeneracy control signals.

14. The control circuit according to claim 13, further comprising:
a second voltage comparator for comparing the output voltage with a second reference voltage that is lower than the first reference voltage to generate a second voltage comparison signal;
wherein when the second voltage comparison signal indicates that the output voltage is lower than the second reference voltage, the signal generation circuit invalidates the current comparison signals of the current comparison circuit and the degeneracy control signals and generates the control signals to synchronously operate the converter units.

15. The control circuit according to claim 13, further comprising:
a second voltage comparator for comparing the output voltage with a second reference voltage that is lower than the first reference voltage to generate a second voltage comparison signal;
wherein when the second voltage comparison signal indicates that the output voltage is lower than the second reference voltage, the signal generation circuit invalidates the current comparison signals generated by the current comparison circuit and generates the control signals to synchronously operate operable converter units selected by the degeneracy control signals.

16. A method for controlling a multi-phase DC—DC converter including an output terminal and a plurality of converter units, each receiving an input voltage and generating an output voltage for the output terminal of the DC—DC converter, the method comprising:
comparing the output voltage with a first reference voltage to generate a first voltage comparison signal indicating the comparison result;
comparing a plurality of output currents that are in accordance with the output voltages generated by the converter units to generate a plurality of current comparison signals respectively corresponding to the converter units; and
generating a plurality of control signals for respectively controlling the converter units so that a converter unit through which a smaller output current flows is operated in accordance with the current comparison signals when the first voltage comparison signal indicates that the output voltage is lower than the first reference voltage.

17. The method according to claim 16, further comprising:
comparing the output voltage with a second reference voltage that is lower than the first reference voltage to generate a second voltage comparison signal;
wherein said generating a plurality of control signals includes invalidating the plurality of current comparison signals and generating the control signals to synchronously operate the converter units when the second voltage comparison signal indicates that the output voltage at the output terminal is lower than the second reference voltage.

18. The method according to claim 16, further comprising:
adding the output currents of the converter units to obtain a total output current and generate a plurality of degeneracy control signals for selectively inactivating the converter units based on the total output current;
wherein said generating a plurality of current comparison signals includes generating the current comparison signals to selectively inactivate the plurality of converter units in accordance with the plurality of degeneracy control signals.

19. The method according to claim 18, further comprising:
comparing the output voltage with a second reference voltage that is lower than the first reference voltage to generate a second voltage comparison signal;
wherein said generating a plurality of control signals includes invalidating the current comparison signals and the degeneracy control signals and generating the control signals to synchronously operate the converter units when the second voltage comparison signal indicates that the output voltage at the output terminal is lower than the second reference voltage.

20. The method according to claim 18, further comprising:
comparing the output voltage with a second reference voltage that is lower than the first reference voltage to generate a second voltage comparison signal;
wherein said generating a plurality of control signals includes invalidating the current comparison signals and generating the control signals to synchronously operate operable converter units that are selected by the degeneracy control signals when the second voltage comparison signal indicates that the output voltage at the output terminal is lower than the second reference voltage.

* * * * *